US012106703B2

(12) United States Patent
Sako et al.

(10) Patent No.: US 12,106,703 B2
(45) Date of Patent: Oct. 1, 2024

(54) DISPLAY DEVICE

(71) Applicant: Japan Display Inc., Tokyo (JP)

(72) Inventors: Kazuhiko Sako, Tokyo (JP); Kazunari Tomizawa, Tokyo (JP); Tsutomu Harada, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/137,817

(22) Filed: Apr. 21, 2023

(65) Prior Publication Data

US 2023/0298512 A1 Sep. 21, 2023

Related U.S. Application Data

(63) Continuation of application No. 17/727,058, filed on Apr. 22, 2022, now Pat. No. 11,663,959.

(30) Foreign Application Priority Data

Apr. 28, 2021 (JP) ................................ 2021-076509

(51) Int. Cl.
*G09G 3/32* (2016.01)
*G09G 3/20* (2006.01)
*G09G 3/3258* (2016.01)

(52) U.S. Cl.
CPC ............ *G09G 3/32* (2013.01); *G09G 3/2007* (2013.01); *G09G 3/3258* (2013.01);
(Continued)

(58) Field of Classification Search
CPC ...... G09G 3/32; G09G 3/2007; G09G 3/3258; G09G 2320/0271; G09G 2340/06; G09G 2360/16
See application file for complete search history.

(56) References Cited

U.S. PATENT DOCUMENTS 8,212,753 B2 7/2012 Tomizawa
8,405,687 B2 3/2013 Miyazaki et al.
(Continued)

FOREIGN PATENT DOCUMENTS

JP 2001-188513 A 7/2001
JP 2001-290458 A 10/2001
(Continued)

OTHER PUBLICATIONS

Office Action issued in related Japanese Patent Application No. 2021-076509, mailed on Jun. 11, 2024 and English translation of same. 6 pages.

*Primary Examiner* — Michael J Jansen, II
(74) *Attorney, Agent, or Firm* — K&L Gates LLP

(57) ABSTRACT

According to an aspect, a display device includes a pixel including a first sub-pixel configured to emit light having a peak in a spectrum of red, a second sub-pixel configured to emit light having a peak in a spectrum of green, and a third sub-pixel configured to emit light having a peak in a spectrum of blue. The first sub-pixel, the second sub-pixel, and the third sub-pixel are inorganic light-emitting diodes. A light emission intensity of the second sub-pixel is increased at a predetermined ratio with respect to a light emission intensity of the first sub-pixel when the first sub-pixel emits light at a light emission intensity within a low-luminance range equal to or lower than a predetermined level of luminance.

8 Claims, 12 Drawing Sheets

(52) U.S. Cl.
CPC . *G09G 2320/0271* (2013.01); *G09G 2340/06* (2013.01); *G09G 2360/16* (2013.01)

(56) References Cited

U.S. PATENT DOCUMENTS

| | | | | |
|---|---|---|---|---|
| 10,522,095 | B2 | 12/2019 | Yata et al. | |
| 11,158,285 | B2 * | 10/2021 | Mizoguchi | G09G 5/02 |
| 11,380,239 | B2 | 7/2022 | Kidoguchi et al. | |
| 11,663,959 | B2 * | 5/2023 | Sako | G09G 3/32 345/55 |
| 11,847,987 | B2 * | 12/2023 | Ogawa | G09G 3/3426 |
| 2002/0030449 | A1 | 3/2002 | Okazaki et al. | |
| 2003/0016198 | A1 | 1/2003 | Nagai et al. | |
| 2009/0167657 | A1 * | 7/2009 | Tomizawa | G09G 5/02 345/87 |
| 2010/0321414 | A1 | 12/2010 | Muroi et al. | |
| 2011/0128309 | A1 * | 6/2011 | Miyazaki | H04N 9/68 345/690 |
| 2017/0061903 | A1 * | 3/2017 | Yata | G09G 3/3607 |
| 2018/0174528 | A1 | 6/2018 | Botzas et al. | |
| 2019/0221188 | A1 * | 7/2019 | Mizoguchi | G09G 5/10 |
| 2021/0398471 | A1 * | 12/2021 | Kidoguchi | G09G 3/2003 |
| 2022/0059043 | A1 | 2/2022 | Ogawa et al. | |
| 2022/0351675 | A1 * | 11/2022 | Sako | G09G 3/2003 |
| 2023/0298512 | A1 * | 9/2023 | Sako | G09G 3/2007 345/55 |

FOREIGN PATENT DOCUMENTS

| | | | |
|---|---|---|---|
| JP | 2003-345309 | A | 12/2003 |
| JP | 2020-187180 | A | 11/2020 |

* cited by examiner

DISPLAY DEVICE

CROSS-REFERENCE TO RELATED APPLICATION

This application is a continuation of U.S. patent application Ser. No. 17/727,058, filed on Apr. 22, 2022, which claims the benefit of priority from Japanese Patent Application No. 2021-076509 filed on Apr. 28, 2021, the entire contents of which are incorporated herein by reference.

BACKGROUND

1. Technical Field

What is disclosed herein relates to a display device.

2. Description of the Related Art

Display devices that display images using micro-light-emitting diodes (LEDs) are known (for example, Japanese Patent Application Laid-open Publication No. 2020-187180).

A peak of a spectrum of light of a micro-LED may change with an amount of current applied thereto. In particular, when a micro-LED for emitting light having a spectrum having a peak at a wavelength of red is used as a red sub-pixel, the chromaticity of reproduced red may change depending on the light emission intensity. This is because the degree of mixture of a spectrum of green changes between a low-luminance state where the micro-LED is lit up by a relatively small current and a high-luminance state where the micro-LED is lit up by a relatively large current. Such a change in the chromaticity of red is required to be reduced.

For the foregoing reasons, there is a need for a display device capable of reducing the change in the chromaticity caused by change in level of the light emission intensity.

SUMMARY

According to an aspect, a display device includes a pixel including a first sub-pixel configured to emit light having a peak in a spectrum of red, a second sub-pixel configured to emit light having a peak in a spectrum of green, and a third sub-pixel configured to emit light having a peak in a spectrum of blue. The first sub-pixel, the second sub-pixel, and the third sub-pixel are inorganic light-emitting diodes. A light emission intensity of the second sub-pixel is increased at a predetermined ratio with respect to a light emission intensity of the first sub-pixel when the first sub-pixel emits light at a light emission intensity within a low-luminance range equal to or lower than a predetermined level of luminance.

DETAILED DESCRIPTION

Figure 1:
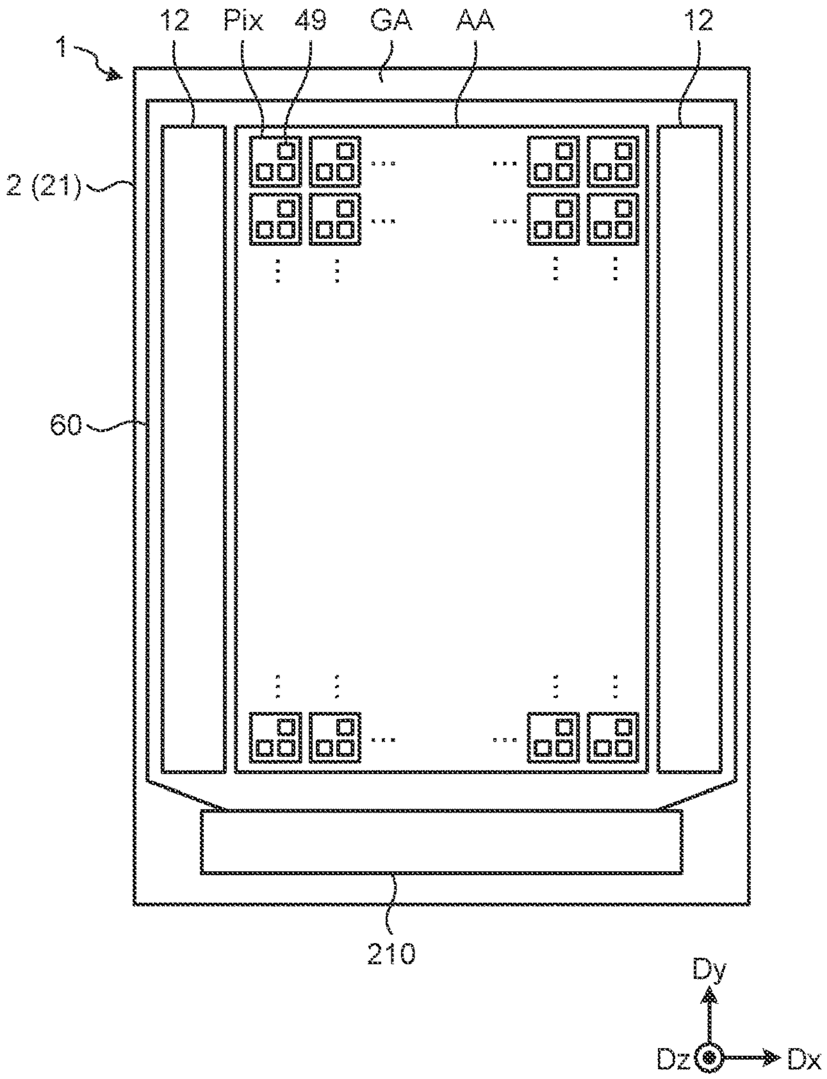
FIG. 1 is a plan view schematically illustrating a display device according to an embodiment of the present disclosure.

The following describes an embodiment of the present disclosure with reference to the drawings. What is disclosed herein is merely an example, and the present disclosure naturally encompasses appropriate modifications easily conceivable by those skilled in the art while maintaining the gist of the disclosure. To further clarify the description, the drawings may schematically illustrate, for example, widths, thicknesses, and shapes of various parts as compared with actual aspects thereof. However, they are merely examples, and interpretation of the present disclosure is not limited thereto. The same component as that described with reference to an already mentioned drawing is denoted by the same reference numeral through the specification and the drawings, and detailed description thereof may be omitted where appropriate.

FIG. 1 is a plan view schematically illustrating a display device according to an embodiment of the present disclosure. As illustrated in FIG. 1, a display device 1 includes an array substrate 2, pixels Pix, a drive circuit 12, a drive integrated circuit (IC) 210, and cathode wiring 60. The array substrate 2 is a drive circuit board for driving each of the pixels Pix and is also called “backplane” or “active matrix substrate”. The array substrate 2 includes, for example, a substrate 21, a plurality of transistors, a plurality of capacitors, and various types of wiring.

As illustrated in FIG. 1, the display device 1 has a display area AA and a peripheral area GA. The display area AA is an area that is disposed so as to overlap the pixels Pix and displays an image. The peripheral area GA is an area not overlapping the pixels Pix and is disposed outside the display area AA.

The pixels Pix are arranged in a first direction Dx and a second direction Dy in the display area AA of the substrate 21. The first direction Dx and the second direction Dy are directions parallel to a surface of the substrate 21. The first direction Dx is orthogonal to the second direction Dy. However, the first direction Dx may non-orthogonally intersect the second direction Dy. A third direction Dz is a direction orthogonal to the first direction Dx and the second direction Dy. The third direction Dz corresponds to, for example, a direction normal to the substrate 21. Hereinafter, the term "plan view" refers to a positional relation when viewed from the third direction Dz.

The drive circuit 12 is a circuit that drives a plurality of gate lines (for example, a reset control signal line L5, an output control signal line L6, a pixel control signal line L7, and an initialization control signal line L8 (refer to FIG. 3)) based on various control signals from the drive IC 210. The drive circuit 12 sequentially or simultaneously selects the gate lines and supplies gate drive signals to the selected gate lines. By this operation, the drive circuit 12 selects the pixels Pix coupled to the gate lines.

The drive IC 210 is a circuit that controls the display of the display device 1. The drive IC 210 is mounted as a chip on glass (COG) in the peripheral area GA of the substrate 21. The drive IC 210 is not limited to this configuration and may be mounted as a chip on film (COF) on a flexible printed circuit board or a rigid circuit board coupled to the peripheral area GA of the substrate 21.

The cathode wiring 60 is provided in the peripheral area GA of the substrate 21. The cathode wiring 60 is provided so as to surround the pixels Pix in the display area AA and the drive circuit 12 in the peripheral area GA. The cathodes of a plurality of light-emitting elements 3 are coupled to the cathode wiring 60 that is common thereto, and are supplied with a fixed potential (such as a ground potential).

Figure 2:
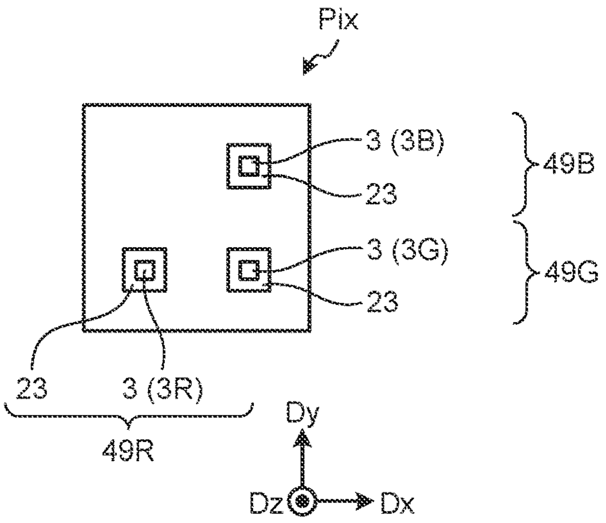
FIG. 2 is a plan view illustrating each of a plurality of pixels.

FIG. 2 is a plan view illustrating each of the pixels. As illustrated in FIG. 2, each of the pixels Pix includes a plurality of sub-pixels 49. For example, the pixel Pix includes a first sub-pixel 49R, a second sub-pixel 49G, and a third sub-pixel 49B. The first sub-pixel 49R emits light having a peak in a red spectrum. The second sub-pixel 49G emits light having a peak in a green spectrum. The third sub-pixel 49B emits light having a peak in a blue spectrum. Color reproduction is performed using additive color mixture with combination of the light from the first sub-pixel 49R, the light from the second sub-pixel 49G, and the light from the third sub-pixel 49B. As illustrated in FIG. 2, in each of the pixels Pix, the first sub-pixel 49R and the second sub-pixel 49G are arranged in the first direction Dx. The second sub-pixel 49G and the third sub-pixel 49B are arranged in the second direction Dy. A first color, a second color, and a third color are not limited to red, green, and blue, respectively, and can be any selected colors such as complementary colors. Hereinafter, the first sub-pixel 49R, the second sub-pixel 49G, and the third sub-pixel 49B will each be called a sub-pixel 49 when they need not be distinguished from one another.

Each of the sub-pixels 49 includes a corresponding one of the light-emitting elements 3 and an anode electrode 23. Light-emitting elements 3R, 3G, and 3B included in the first sub-pixel 49R, the second sub-pixel 49G, and the third sub-pixel 49B, respectively, emit light in different colors, whereby the display device 1 displays an image. The light-emitting element 3 is an inorganic light-emitting diode chip having a size of approximately 3 μm to 300 μm in the plan view, and is called a micro-LED. The display device 1 including the micro-LEDs in each of the pixels is also called a micro-LED display device. The term "micro" in the "micro-LED" does not limit the size of the light-emitting element 3.

The light-emitting elements 3 may emit light in four or more different colors. The arrangement of the sub-pixels 49 is not limited to the configuration illustrated in FIG. 2. For example, the first sub-pixel 49R may be adjacent to the third sub-pixel 49B in the first direction Dx. The first sub-pixel 49R, the second sub-pixel 49G, and the third sub-pixel 49B may be repeatedly arranged in this order in the first direction Dx.

Figure 3:
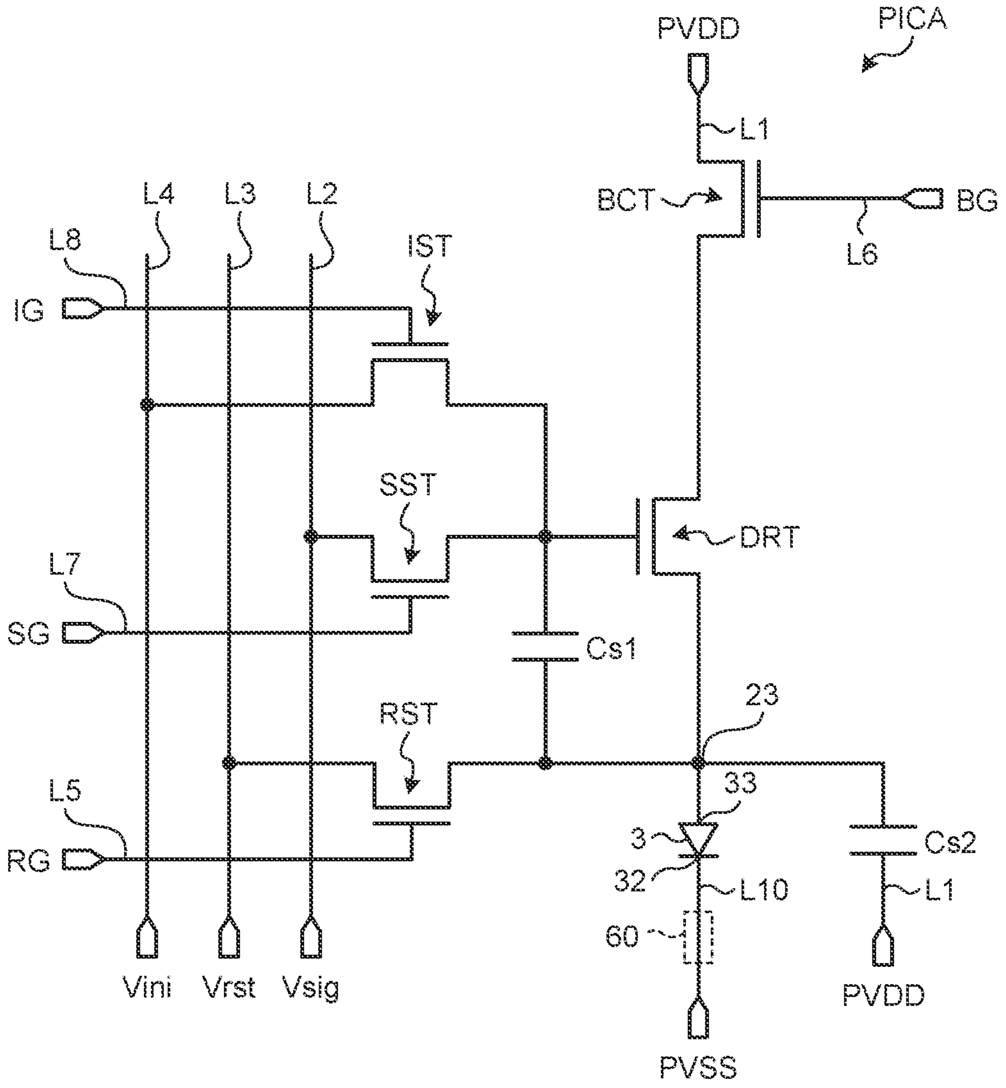
FIG. 3 is a circuit diagram illustrating a pixel circuit.

FIG. 3 is a circuit diagram illustrating a pixel circuit. FIG. 3 illustrates a pixel circuit PICA provided in one of the sub-pixels 49. The pixel circuit PICA is provided in each of the sub-pixels 49. As illustrated in FIG. 3, the pixel circuit PICA includes the light-emitting element 3, five transistors, and two capacitors. Specifically, the pixel circuit PICA includes a drive transistor DRT (transistor), an output transistor BCT, an initialization transistor IST, a pixel selection transistor SST, and a reset transistor RST. Each of the drive transistor DRT, the output transistor BCT, the initialization transistor IST, the pixel selection transistor SST, and the reset transistor RST is constituted by an n-type thin film transistor (TFT). The pixel circuit PICA also includes a first capacitor Cs1 and a second capacitor Cs2.

The cathode (cathode terminal 32) of the light-emitting element 3 is coupled to a cathode power supply line L10. The anode (anode terminal 33) of the light-emitting element 3 is coupled to an anode power supply line L1 through the drive transistor DRT and the output transistor BCT. The anode power supply line L1 is supplied with an anode power supply potential PVDD. The cathode power supply line L10 is supplied with a cathode power supply potential PVSS through the cathode wiring 60. The anode power supply potential PVDD is a higher potential than the cathode power supply potential PVSS.

The anode power supply line L1 supplies the anode power supply potential PVDD serving as a drive potential to the sub-pixel 49. Specifically, the light-emitting element 3 ideally emits light by being supplied with a forward current (drive current) caused by a potential difference (PVDD−PVSS) between the anode power supply potential PVDD and the cathode power supply potential PVSS. That is, the anode power supply potential PVDD has a potential difference with respect to the cathode power supply potential PVSS to cause the light-emitting element 3 to emit light. The anode terminal 33 of the light-emitting element 3 is electrically coupled to the anode electrode 23, and the second capacitor Cs2 is coupled as an equivalent circuit between the anode electrode 23 and the anode power supply line L1.

The source electrode of the drive transistor DRT is coupled to the anode terminal 33 of the light-emitting element 3 through the anode electrode 23, and the drain electrode of the drive transistor DRT is coupled to the source electrode of the output transistor BCT. The gate electrode of the drive transistor DRT is coupled to the first capacitor Cs1, the drain electrode of the pixel selection transistor SST, and the drain electrode of the initialization transistor IST.

The gate electrode of the output transistor BCT is coupled to the output control signal line L6. The output control signal line L6 is supplied with an output control signal BG. The drain electrode of the output transistor BCT is coupled to the anode power supply line L1.

The source electrode of the initialization transistor IST is coupled to an initialization power supply line L4. The initialization power supply line L4 is supplied with an initialization potential Vini. The gate electrode of the initialization transistor IST is coupled to the initialization control signal line L8. The initialization control signal line L8 is supplied with an initialization control signal IG. That is, the gate electrode of the drive transistor DRT is coupled to the initialization power supply line L4 through the initialization transistor IST.

The source electrode of the pixel selection transistor SST is coupled to a video signal line L2. The video signal line L2 is supplied with a video signal Vsig. The gate electrode of the pixel selection transistor SST is coupled to the pixel control signal line L7. The pixel control signal line L7 is supplied with a pixel control signal SG.

The source electrode of the reset transistor RST is coupled to a reset power supply line L3. The reset power supply line L3 is supplied with a reset power supply potential Vrst. The gate electrode of the reset transistor RST is coupled to the reset control signal line L5. The reset control signal line L5 is supplied with a reset control signal RG. The drain electrode of the reset transistor RST is coupled to the anode electrode 23 (the anode terminal 33 of the light-emitting element 3) and the source electrode of the drive transistor DRT. A reset operation of the reset transistor RST resets voltages stored in the first capacitor Cs1 and the second capacitor Cs2.

The first capacitance Cs1 is provided as an equivalent circuit between the drain electrode of the reset transistor RST and the gate electrode of the drive transistor DRT. The pixel circuit PICA can use the first capacitance Cs1 and the second capacitance Cs2 to reduce fluctuations in gate voltage of the drive transistor DRT caused by parasitic capacitance and current leakage thereof.

In the following description, the anode power supply line L1 and the cathode power supply line L10 may each be simply referred to as a "power supply line". The video signal line L2, the reset power supply line L3, and the initialization power supply line L4 may each be referred to as a "signal line". The reset control signal line L5, the output control signal line L6, the pixel control signal line L7, and the initialization control signal line L8 may each be referred to as a "gate line".

The gate electrode of the drive transistor DRT is supplied with a potential corresponding to the video signal Vsig (or gradation signal). That is, the drive transistor DRT supplies a current corresponding to the video signal Vsig to the light-emitting element 3 based on the anode power supply potential PVDD supplied through the output transistor BCT. In this manner, the anode power supply potential PVDD supplied to the anode power supply line L1 is reduced by the drive transistor DRT and the output transistor BCT. As a result, the anode terminal 33 of the light-emitting element 3 is supplied with a potential lower than the anode power supply potential PVDD.

One electrode of the second capacitor Cs2 is supplied with the anode power supply potential PVDD through the anode power supply line L1, and the other electrode of the second capacitor Cs2 is supplied with the potential lower than the anode power supply potential PVDD. That is, the one electrode of the second capacitor Cs2 is supplied with the potential higher than that of the other electrode of the second capacitor Cs2.

In the display device 1, the drive circuit 12 (refer to FIG. 1) sequentially selects a plurality of pixel rows from the top row (for example, a pixel row located at a top portion in the display area AA in FIG. 1). The drive IC 210 writes the video signal Vsig (video writing potential) to the sub-pixels 49 in the selected pixel row to cause the light-emitting elements 3 to emit light. The drive IC 210 supplies the video signal Vsig to the video signal line L2, supplies the reset power supply potential Vrst to the reset power supply line L3, and supplies the initialization potential Vini to the initialization power supply line L4, in each horizontal scanning period. In the display device 1, these operations are repeated for each one-frame image. The video signal Vsig is a signal corresponding to outputs Rout, Gout, and Bout to be described later.

The sub-pixel 49 emits light at a light emission intensity based on a gradation value indicated by an input signal that serves as the source of the video signal Vsig. The input signal is a signal received by the display device 1 and is a signal corresponding to an image to be output. Taking a case as an example where a red-green-blue (RGB) image signal representing a gradation value of each of red, green, and blue using an 8-bit value is received as the input signal, the sub-pixel 49 is turned off when the gradation value is zero. In this example, when the gradation value exceeds zero, the light is emitted at a lower intensity as the gradation value is closer to zero and is emitted at a higher intensity as the gradation value is closer to the maximum value (255).

A reproduced color of each of the first sub-pixel 49R and second sub-pixel 49G may be changed depending on the level of the light emission intensity. The following describes a relation between the level of the light emission intensity and a reproduced color with reference to FIG. 4.

Figure 4:
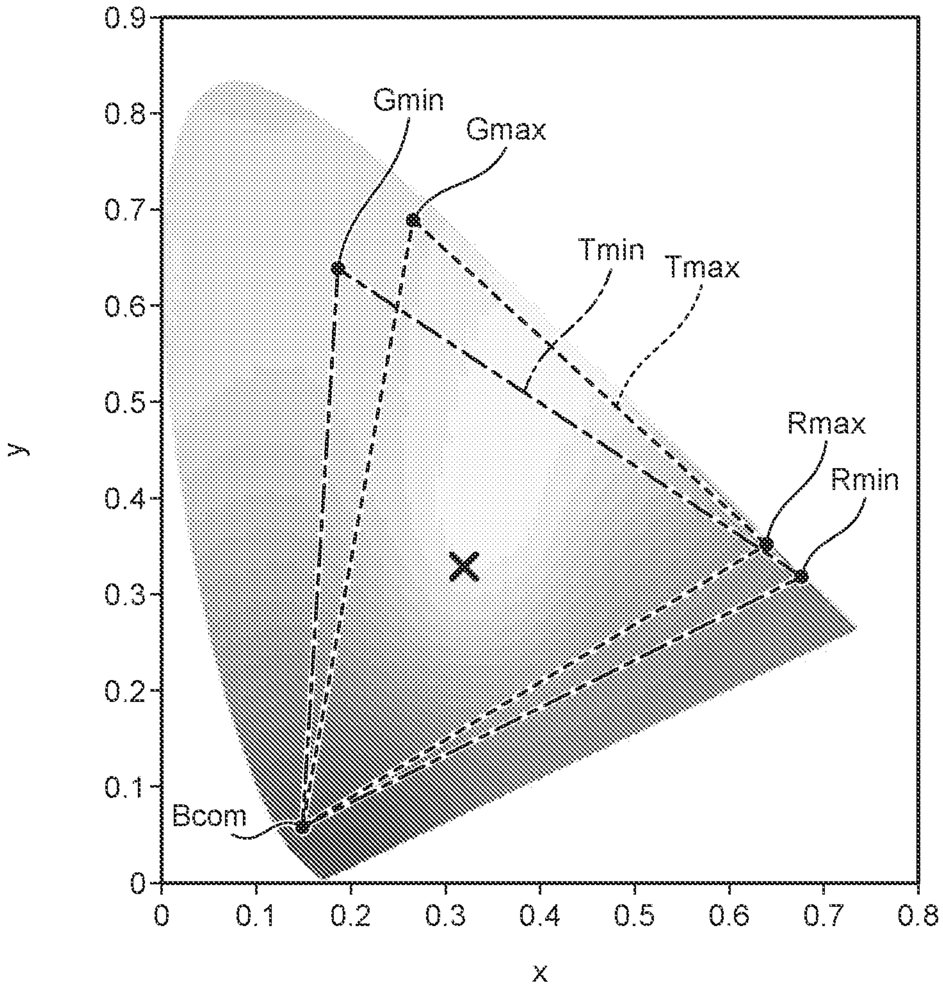
FIG. 4 is a diagram illustrating a change in reproduced color in a chromaticity diagram caused by a change in level of a light emission intensity.

FIG. 4 is a diagram illustrating the change in the reproduced color in a chromaticity diagram caused by the change in level of the light emission intensity. The chromaticity diagram illustrated in FIG. 4 is an xy chromaticity diagram of the CIE 1931 color space as defined by the International Commission on Illumination (Commission internationale de l'éclairage, where "'" in "l'éclairage" is originally an apostrophe, and "é" immediately following it is "e" with an accent) (CIE). Hereinafter, the term simply called "chromaticity diagram" refers to the xy chromaticity diagram of the CIE 1931 color space.

Hereinafter, a first red Rmin denotes the color of red that is reproduced in a low-luminance state where a relatively small current flows to emit light at a low light emission intensity within a range of the light emission intensity adjustable by the level of current flowing into the first sub-pixel 49R, and a second red Rmax denotes the color of red that is reproduced in a high-luminance state where a relatively large current flows to emit light at a high light emission intensity. A first green Gmin denotes the color of green that is reproduced in a low-luminance state where a relatively small current flows to emit light at a low light emission intensity within a range of the light emission intensity adjustable by the level of current flowing into the second sub-pixel 49G, and a second green Gmax denotes the color of green that is reproduced in a high-luminance state where a relatively large current flows to emit light at a high light emission intensity.

As illustrated in FIG. 4, the second red Rmax is located on the green side of the first red Rmin in the chromaticity diagram. It can be said from this fact that the light emitted from the first sub-pixel 49R in the high-luminance state reproducing the second red Rmax is light under a stronger influence of a green spectrum than the light emitted from the first sub-pixel 49R in the low-luminance state reproducing the first red Rmin. Such a difference between the first red Rmin and the second red Rmax is caused by light emission characteristics of the first sub-pixel 49R. That is, the spectrum of the light emitted by the first sub-pixel 49R differs between the low-luminance state and the high-luminance state.

As illustrated in FIG. 4, the second green Gmax is located closer to the red side in the chromaticity diagram than the first green Gmin is. It can be said from this fact that the light emitted from the second sub-pixel 49G in the high-luminance state reproducing the second green Gmax is light under a stronger influence of a red spectrum than the light emitted from the second sub-pixel 49G in the low-luminance state reproducing the first green Gmin. It can also be said that the light emitted from the second sub-pixel 49G in the low-luminance state reproducing the first green Gmin is light under a stronger influence of a blue spectrum than the light emitted from the second sub-pixel 49G in the high-luminance state reproducing the second green Gmax. Such a difference between the first green Gmin and the second green Gmax is caused by light emission characteristics of the second sub-pixel 49G. That is, the spectrum of the light emitted by the second sub-pixel 49G differs between the low-luminance state and the high-luminance state.

The third sub-pixel 49B has light emission characteristics that reproduce blue Bcom in the chromaticity diagram illustrated in FIG. 4 regardless of the level of the light emission intensity when it is lit up.

When the relation between the first red Rmin and the second red Rmax, the relation between the first green Gmin and the second green Gmax, and the blue color Bcom are considered, a chromaticity range that can be reproduced when the first sub-pixel 49R, the second sub-pixel 49G, and the third sub-pixel 49B are all in the low-luminance state can be expressed as a first chromaticity range Tmin illustrated in FIG. 4. The first chromaticity range Tmin is a chromaticity range having a triangular shape having vertices at the first red Rmin, the first green Gmin, and the blue Bcom. A chromaticity range that can be reproduced when the first sub-pixel 49R, the second sub-pixel 49G, and the third sub-pixel 49B are all in the high-luminance state can be expressed as a second chromaticity range Tmax illustrated in FIG. 4. The second chromaticity range Tmax is a chromaticity range having a triangular shape having vertices at the second red Rmax, the second green Gmax, and the blue Bcom. The symbol X illustrated in the first chromaticity range Tmin and the second chromaticity range Tmax indicates a location of the chromaticity of white.

Figure 5:
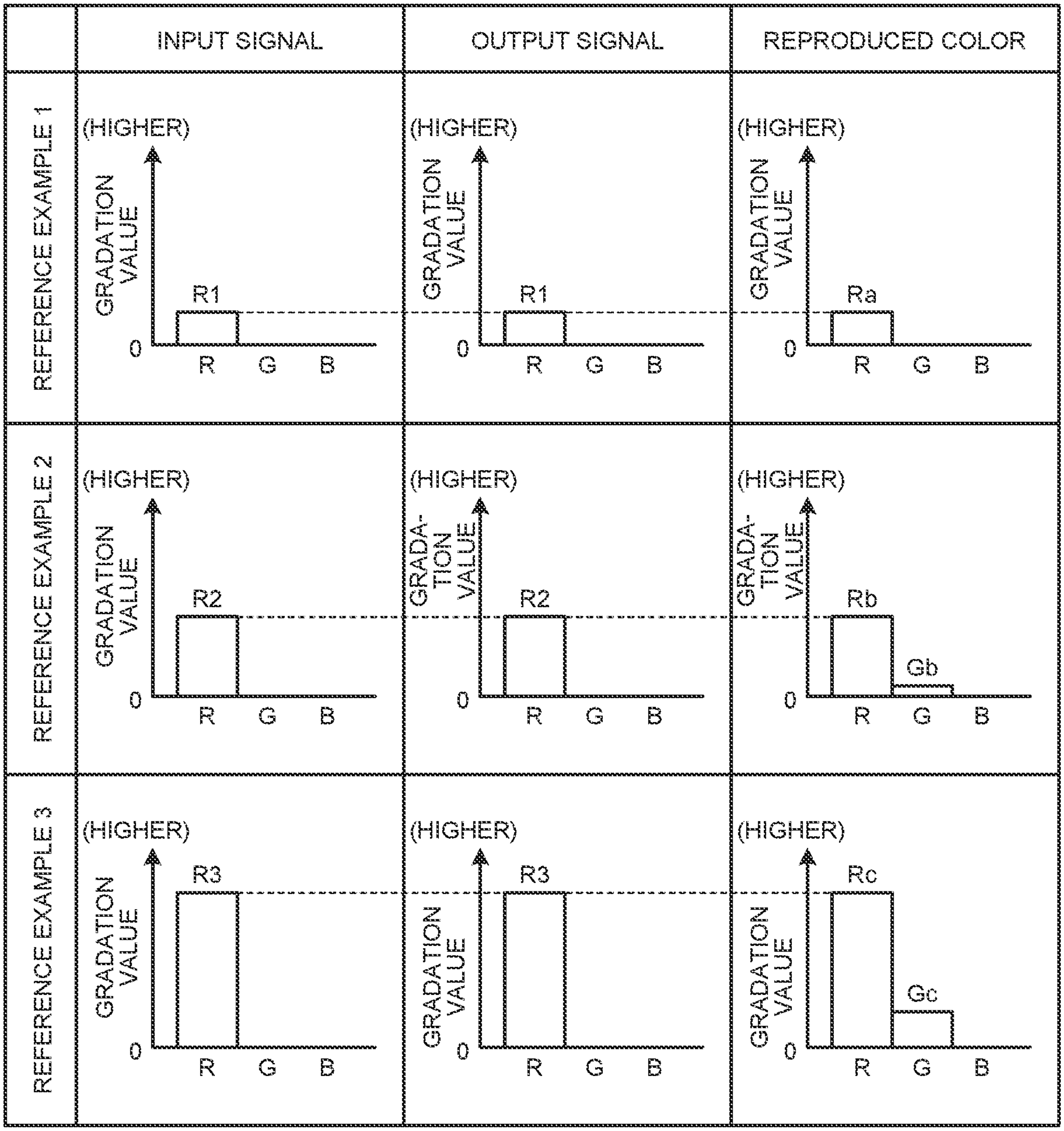
FIG. 5 is a chart illustrating the change in reproduced color caused by the change in level of the light emission intensity of a first sub-pixel, using comparison between Reference Example 1, Reference Example 2, and Reference Example 3.

With reference to FIG. 5, the following further describes phenomena caused by the light emission characteristics of the first sub-pixel 49R among the light emission characteristics of the sub-pixels 49 described with reference to FIG. 4. In each of reference examples described with reference to FIG. 5, unlike the embodiment, control is applied in which the original gradation value indicated by the input signal is reflected in an output signal, that is, the video signal Vsig, and the resultant signal is applied to the first sub-pixel 49R.

FIG. 5 is a chart illustrating the change in reproduced color caused by the change in level of the light emission intensity of the first sub-pixel 49R, using comparison between Reference Example 1, Reference Example 2, and Reference Example 3. Reference Example 1 illustrated in FIG. 5 illustrates a case where the first sub-pixel 49R is lit up in the low-luminance state where the first red Rmin is reproduced. Reference Example 2 illustrates a case where the first sub-pixel 49R is lit up in an intermediate luminance state between the low-luminance state where the first red Rmin is reproduced and the high-luminance state where the second red Rmax is reproduced. Reference Example 3 illustrates a case where the first sub-pixel 49R is lit up in the high-luminance state where the second red Rmax is reproduced.

As illustrated in FIG. 5, in Reference Example 1, the gradation value of red indicated by the input signal is lower than those in Reference Example 2 and Reference Example 3. In Reference Example 3, the gradation value of red indicated by the input signal is higher than those in Reference Example 1 and Reference Example 2. In Reference Example 2, the gradation value of red indicated by the input signal is higher than that in Reference Example 1 and lower than that in Reference Example 3.

In FIG. 5, a gradation value R1 denotes the gradation value of red indicated by the input signal in Reference Example 1. A gradation value R2 denotes the gradation value of red indicated by the input signal in Reference Example 2. A gradation value R3 denotes the gradation value of red indicated by the input signal in Reference Example 3. As illustrated in FIG. 5, the output signal of each of Reference Example 1, Reference Example 2, and Reference Example 3 reflects the input signal thereof as it is.

Reference Example 1 illustrates that the color of light reproduced by the first sub-pixel 49R lit up in accordance with the gradation value R1 serving as a gradation value of red indicated by the output signal can be represented by a gradation value Ra serving as a gradation value of red. In other words, the first red Rmin has the gradation value Ra when it is expressed by the gradation value of red. As illustrated in Reference Example 1, the color of light reproduced by the first sub-pixel 49R lit up in accordance with the gradation value R1 contains only a red component, and does not contain a green component or a blue component. However, when an output signal corresponding to a higher gradation value is applied, the hue of an R pixel as a reproduced color actually seen by humans shifts to a color containing a green component with respect to the output signal.

For example, Reference Example 2 illustrates that the color of light reproduced by the first sub-pixel 49R lit up in accordance with the gradation value R2 serving as a gradation value of red indicated by the output signal can be represented by a combination of a gradation value Rb serving as a gradation value of red and a gradation value Gb serving as a gradation value of green. Reference Example 3 illustrates that the color of light reproduced by the first sub-pixel 49R lit up in accordance with the gradation value R3 serving as a gradation value of red indicated by the output signal can be represented by a combination of a gradation value Rc serving as a gradation value of red and a gradation value Gc serving as a gradation value of green. In other words, when the second red Rmax is expressed by gradation values, the gradation values are a combination of the gradation value Rc and the gradation value Gc.

In addition, the ratio of the gradation value Gc to the gradation value Rc in Reference Example 3 is smaller than the ratio of the gradation value Gb to the gradation value Rb in Reference Example 2. That is, the influence of the green spectrum is stronger in Reference Example 3 than in Reference Example 2. As indicated by the above comparison of Reference Example 1, Reference Example 2, and Reference Example 3, the first sub-pixel 49R exhibits the light emission characteristics in which the green component in the color reproduced by light emission becomes stronger as the light emission intensity increases. Such light emission characteristics cause the difference between the first red Rmin and the second red Rmax as described with reference to FIG. 4. In other words, the reproduced color of the first sub-pixel 49R changes so as to move from the first red Rmin side toward the second red Rmax side in the chromaticity diagram as the light emission intensity increases. Thus, in the reference examples, the chromaticity of red that is reproduced by lighting of the first sub-pixel 49R changes with the level of the gradation value of red indicated by the input signal. Specifically, increasing the gradation (increasing a current to an organic light-emitting diode (OLED)) increases the degree of mixing of green in the hue of the R pixel as the reproduced color actually seen by humans with respect to the output signal.

Therefore, the drive IC 210 of the embodiment performs signal processing to stabilize the chromaticity of red that is reproduced by the lighting of the pixels Pix regardless of the level of the gradation value of red indicated by the input signal.

Figure 6:
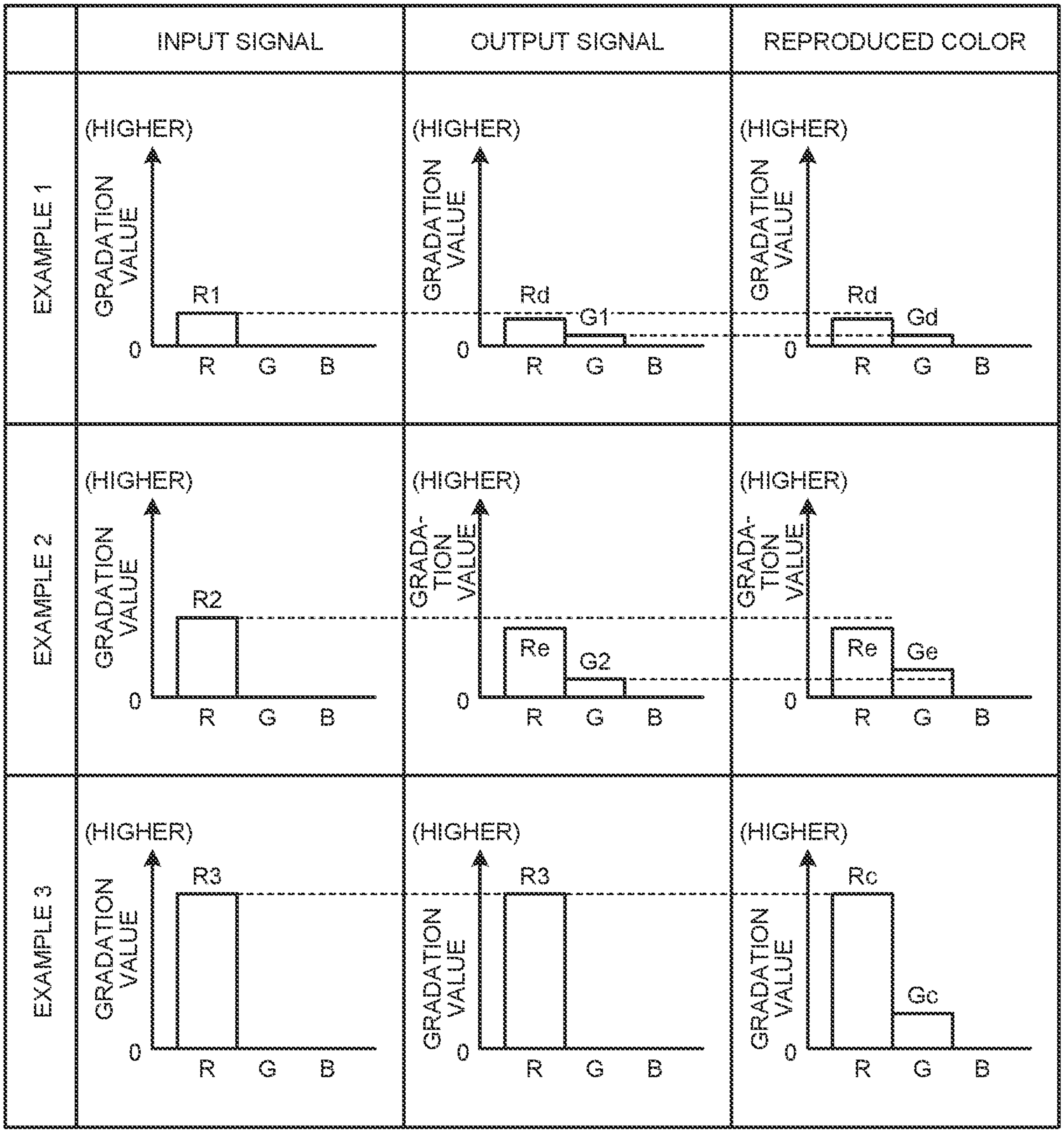
FIG. 6 is a chart illustrating Example 1, Example 2, and Example 3 obtained by signal processing performed in the embodiment.

FIG. 6 is a chart illustrating Example 1, Example 2, and Example 3 obtained by the signal processing performed in the embodiment. The input signal in Example 1 is the same as that in Reference Example 1 (refer to FIG. 5). The input signal in Example 2 is the same as that in Reference Example 2 (refer to FIG. 5). The input signal in Example 3 is the same as that in Reference Example 3 (refer to FIG. 5).

When the first sub-pixel 49R emits light at a light emission intensity within a low-luminance range equal to or lower than a predetermined level of luminance, the drive IC 210 performs the signal processing to increase the light emission intensity of the second sub-pixel 49G at a predetermined ratio with respect to the light emission intensity of the first sub-pixel 49R. Specifically, the drive IC 210 performs the signal processing individually for each of the pixels Pix to add a green component to the output signal at a higher ratio with respect to the gradation value of red as the gradation value of red in the input signal is higher within the low-luminance range. In addition, the drive IC 210 causes a decrease in luminance of the first sub-pixel 49R corresponding to an increase in luminance of the pixel Pix caused by lighting of the second sub-pixel 49G resulting from the addition of the green component. Specifically, to reduce the luminance, the drive IC 210 performs the signal processing individually for each of the pixels Pix to lower the gradation value of red in the output signal to a value below the gradation value of red in the input signal. The output signal in Example 1 further includes a gradation value G1 serving as a gradation value of green, in addition to a gradation value Rd lower than the gradation value R1 included in the input signal in Example 1. The output signal in Example 2 further includes a gradation value G2 serving as a gradation value of green, in addition to a gradation value Re lower than the gradation value R2 included in the input signal in Example 2.

According to the output signals described above, the reproduced color of the pixel Pix in Example 1 is a color that can be represented by a combination of the gradation value Rd serving as a gradation value of red and a gradation value Gd serving as a gradation value of green. Also, the reproduced color of the pixel Pix in Example 2 is a color that can be represented by a combination of the gradation value Re serving as a gradation value of red and a gradation value Ge serving as a gradation value of green.

The output signal in Example 3 includes the gradation value R3 included in the input signal in Example 3 and does not include a green component. Thus, in the same manner as with the reproduced color of the first sub-pixel 49R in Reference Example 3, the reproduced color of the pixel Pix in Example 3 is a color that can be represented by a combination of the gradation value Rc serving as a gradation value of red and the gradation value Gc serving as a gradation value of green.

The ratios of the gradation value Rd to the gradation value Gd, the gradation value Re to the gradation value Ge, and the gradation value Rc to the gradation value Gc can be expressed as a common ratio $\alpha:\beta$. That is, the reproduced color of the pixel Pix in Example 1, the reproduced color of the pixel Pix in Example 2, and the reproduced color of the pixel Pix in Example 3 are a common color in the chromaticity diagram. Specifically, the common color is the second red Rmax in FIG. 4. Thus, in the embodiment, the drive IC 210 performs the signal processing to stabilize the chromaticity of red that is reproduced by the lighting of the pixel Pix at the chromaticity corresponding to Rmax illustrated in FIG. 4 regardless of the level of the gradation value of red indicated by the input signal. Thus, performing the output signal control described with reference to FIG. 6 stabilizes the relation between red and blue in the reproduced color on a line between the second red Rmax and the blue Bcom illustrated in FIG. 4. When the output signal control is further performed in accordance with the description to be given later with reference to FIGS. 11 and 12, the relation between red, blue, and green in the reproduced color is stabilized to be a relation having three vertices at the second red Rmax and the blue Bcom illustrated in FIG. 4 and a third green Gtar illustrated in FIG. 11.

As described above, the output signal of Example 3 includes the gradation value R3 included in the input signal of the example and does not include a green component. This is because the drive IC 210 performs the signal processing so as to cause the reproduced color of the first sub-pixel 49R lit up at luminance lower than that of the first sub-pixel 49R that reproduces the second red Rmax to be the second red Rmax in the chromaticity diagram, using the influence of the green spectrum in the second red Rmax as a reference.

The correspondence between the level of the gradation value of red indicated by the input signal and the level of the gradation value of green to be added to the output signal is determined in advance.

Figure 7:
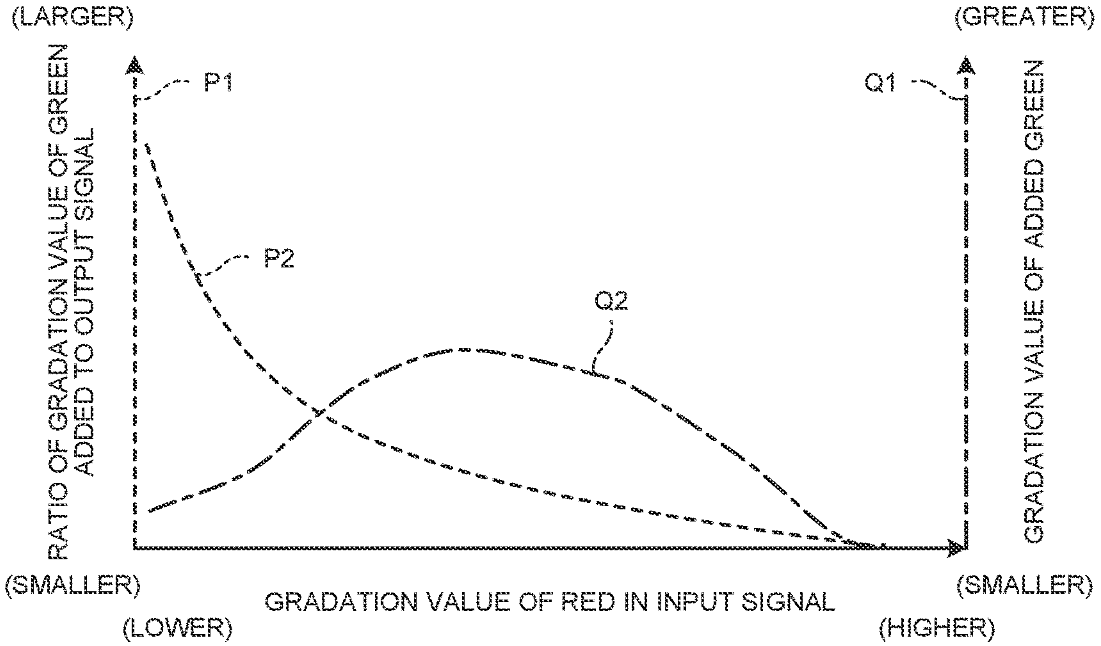
FIG. 7 is a diagram illustrating, using a graph, a correspondence relation between a gradation value of red in an input signal, a ratio of a gradation value of green to be added to an output signal, and the gradation value of the green to be added.

FIG. 7 is a diagram illustrating, using a graph, a correspondence relation between the gradation value of red in the input signal, the ratio of the gradation value of green to be added to the output signal, and the gradation value of the green to be added. In the graph of FIG. 7, the caption of a dashed vertical axis P1 "RATIO OF GRADATION VALUE OF GREEN ADDED TO OUTPUT SIGNAL" refers to the ratio of the gradation value of green to the gradation value of red indicated by the input signal serving as the source of the output signal. That is, a dashed graph P2 illustrated in FIG. 7 indicates what percentage of the gradation value of red indicated by the original input signal is the gradation value of green to be added to the output signal. The signal processing of adding the gradation value of green is performed in order to stabilize the color of red to be reproduced by the pixel Pix, regardless of the gradation value of red indicated by the original input signal.

In the graph of FIG. 7, the caption of a dash-dot-dash vertical axis Q1 "GRADATION VALUE OF ADDED GREEN" refers to the gradation value of green to be added to the output signal depending on the gradation value of red indicated by the input signal. That is, a dash-dot-dash graph Q2 illustrated in FIG. 7 indicates the level of the gradation value of green to be added to the output signal by the signal processing in order to stabilize the color of red to be reproduced by the pixel Pix.

As illustrated by the dashed graph in FIG. 7, the ratio of the gradation value of green to be added to the output signal to the gradation value of red indicated by the input signal increases as the gradation value of red indicated by the input signal decreases. Thus, when viewed in terms of the ratio of the gradation value between red and the gradation value of green, the ratio of the gradation value of green to be added to the output signal increases as the gradation value of red decreases.

In contrast, as illustrated by the dash-dot-dash graph, the gradation value of green to be added to the output signal has a peak in the middle between the minimum value and the maximum value of the gradation value of red indicated by the input signal. More specifically, assuming that the gradation value of red corresponding to the gradation value of green to be added to the output signal is a reference, the gradation value of green to be added to the output signal increases as the gradation value of red (R) indicated by the input signal increases so as to approach the reference from a gradation value of red lower than the reference. The gradation value of green to be added to the output value decreases as the gradation value of red (R) indicated by the input signal increases from the reference. That is, increasing the input gradation value of red reduces the degree of need for "intentional shift to green" by lighting the second sub-pixel 49G. Therefore, the graph Q2 indicates that, on the high-gradation side of "GRADATION VALUE OF RED IN INPUT SIGNAL" in the graph illustrated in FIG. 7, the difference in chromaticity causing the shift of the reproduced color toward green is smaller, and therefore, the amount of G used for the shift also decreases.

Among the items described with reference to FIG. 7, at least the data illustrated by the dash-dot-dash graph, that is, the data indicating the correspondence relation between the gradation value of red indicated by the input signal and the gradation value of green to be added to the output value is measured in advance and held by the drive IC 210. The drive IC 210 refers to the data in the signal processing. The data is, for example, in the form of a lookup table (LUT), but is not limited thereto, and only needs to be data in the same way as the LUT.

Figure 8:
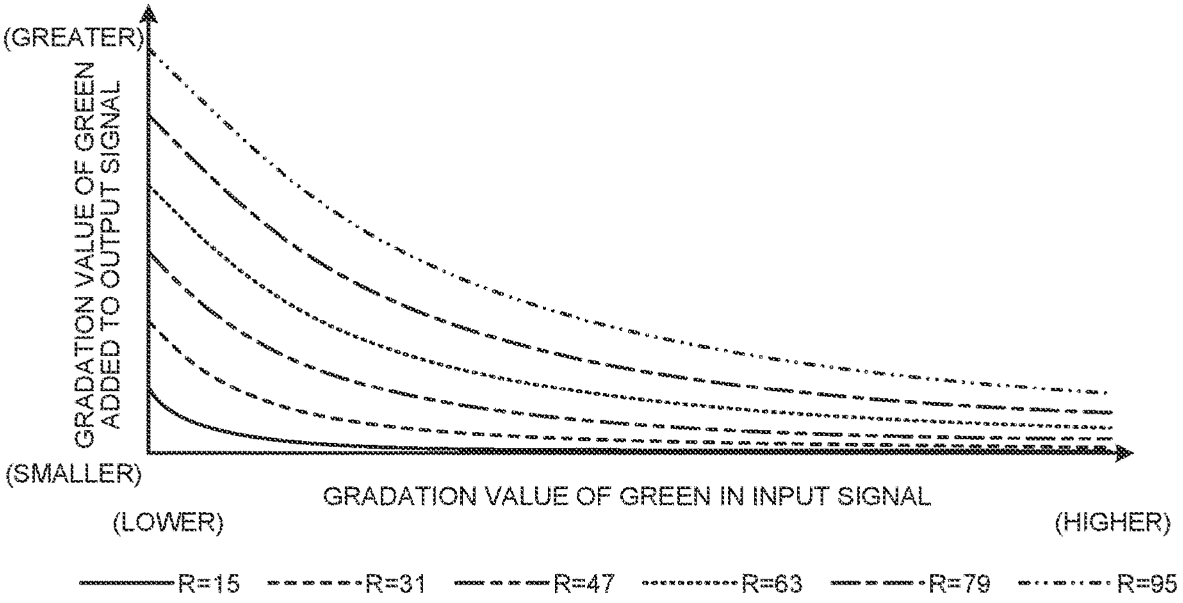
FIG. 8 is a diagram illustrating, using a graph, a relation between a gradation value of green in the input signal and the gradation value of green to be added to the output signal.

In the description given above with reference to FIGS. 6 and 7, a case is assumed where both the gradation value of green and the gradation value of blue indicated by the input signal are zero. With reference to FIG. 8, the following describes in detail how the drive IC 210 performs the signal processing according to the level of the gradation value of green indicated by the input signal.

FIG. 8 is a diagram illustrating, using a graph, a relation between the gradation value of green in the input signal and the gradation value of green to be added to the output signal. In the graph of FIG. 8, the caption of the vertical axis "GRADATION VALUE OF GREEN ADDED TO OUTPUT SIGNAL" refers to the gradation value of green to be added to the output signal by the signal processing based on the gradation value of red (R) indicated by the input signal in order to stabilize the chromaticity of red.

As described with reference to FIG. 7, the gradation value (additional gradation value) of green to be added to the output signal to stabilize the chromaticity of red is determined based on the gradation value of red (R) indicated by the input signal. The input signal includes not only the information indicating the gradation value of red (R) but also the information indicating the gradation value of green. The effect of the additional gradation value on the reproduction of green changes depending on the gradation value of green before the additional gradation value is added. Specifically, as the gradation increases, a smaller additional gradation value is required to obtain a sufficient green component to stabilize the chromaticity of red. This is because gamma conversion processing is performed in the color reproduction in a display output operation based on the input signal. With the gamma conversion, the luminance of green as a reproduced color on a display of a computer increases with increase in the gradation value of green not proportionally, but more significantly. Therefore, the drive IC 210 of the embodiment determines the additional gradation value depending on the gradation value of green in the input signal of the pixel Pix before the additional gradation value is added, as illustrated in FIG. 8.

To give a specific example of the processing, the drive IC 210 sets the gradation value of green before adjustment to the gradation value of green to be added to the output signal in the signal processing to stabilize the chromaticity of red, determined based on the description with reference to FIG. 7. The drive IC 210 sets the value before adjustment to a value when "GRADATION VALUE OF GREEN IN INPUT SIGNAL" in the graph illustrated in FIG. 8 is the lowest. First, the drive IC 210 determines a graph corresponding to the gradation value of red (R) in the input signal, as a graph indicating the relation between the gradation value and the additional gradation value. For example, if the gradation value of red (R) is 15, the drive IC 210 determines the graph of "R=15" in FIG. 8 as the graph indicating the relation between the gradation value and the additional gradation value. Then, the drive IC 210 determines, as the additional gradation value, a value that is on the determined graph and that is in a position in the horizontal axis direction corresponding to "the gradation value of green in the input signal". The drive IC 210 adds the thus determined additional gradation value to the gradation value of green in the input signal of the pixel Pix. Thus, the signal processing is performed to stabilize the chromaticity of red.

FIG. 8 illustrates the cases where the gradation value of red indicated by the input signal is 15 (R=15), 31 (R=31), 47 (R=47), 63 (R=63), 79 (R=79), and 95 (R=95) on the assumption that the gradation value of each color in the input signal is an 8-bit value. However, the gradation value of red is not limited to these examples. The same also applies to other gradation values. The gradation value of green to be added to the output value is determined depending on the relation between the gradation value of green in the input signal and the gradation value of green to be added to the output signal. The low-luminance range in which the gradation value of green is increased by the drive IC depending on the gradation value of red is, for example, a range in which the gradation value of red is 0 to 254 when the gradation value is an 8-bit value. That is, the output signal control causes a color shift when the gradation value is lower than the maximum value.

The data indicated by the graph illustrated in FIG. 8 is measured in advance and held by the drive IC 210. The drive IC 210 refers to the data in the signal processing. The data is, for example, in the form of a LUT, but is not limited thereto, and only needs to be data in the same way as the LUT. Data corresponding to a gamma curve to be referred to in the gamma conversion processing is also held in advance such that the drive IC 210 can refer to the data.

Figure 9:
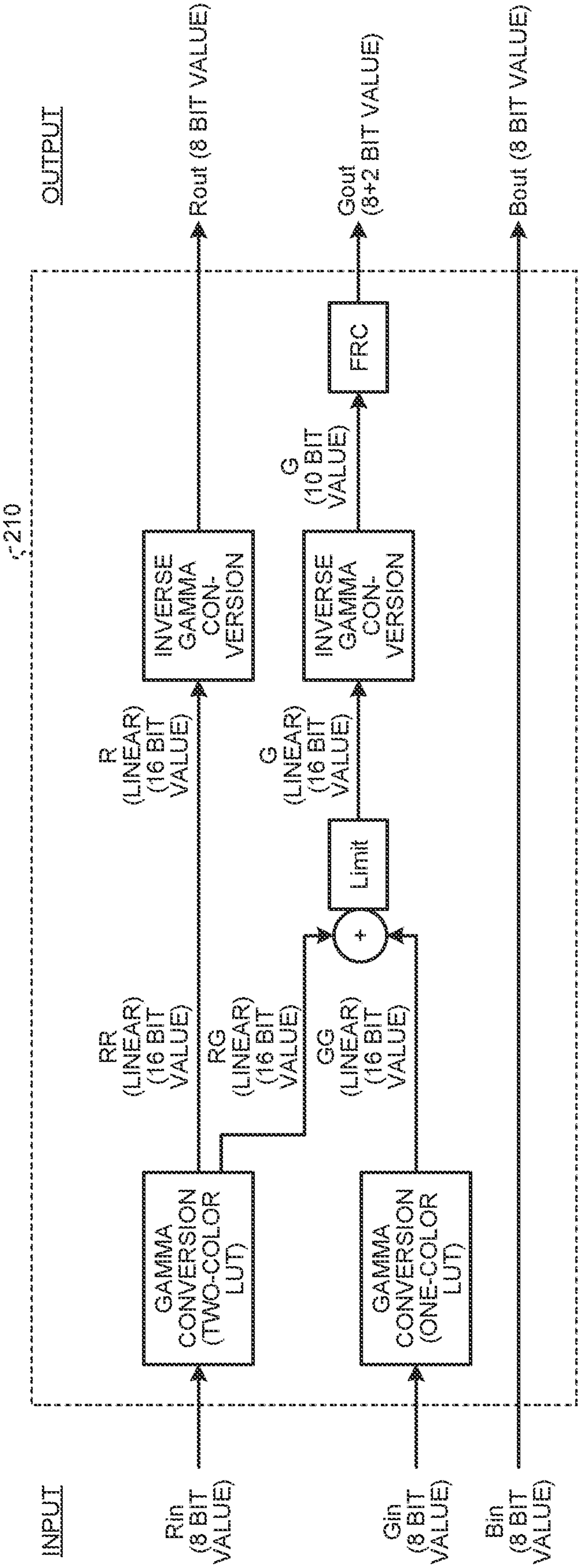
FIG. 9 is a diagram illustrating an exemplary flow of signal processing performed by a drive integrated circuit (IC)

FIG. 9 is a diagram illustrating an exemplary flow of the signal processing performed by the drive IC 210. In FIG. 9, and in FIGS. 10, 13, and 14 to be described later, a gradation value Rin denotes the gradation value of red indicated by the input signal. A gradation value Gin denotes the gradation value of green indicated by the input signal. A gradation value Bin denotes the gradation value of blue indicated by the input signal. The gradation values Rin, Gin, and Bin are values each represented by an amount of information of 8 bits.

The drive IC 210 performs the gamma conversion processing based on the gradation value Rin. Specifically, based on the LUT (two-color LUT) corresponding to the data described above with reference to FIG. 7 and the data corresponding to the gamma curve, the drive IC 210 derives, from the gradation value Rin, a gradation value RR of red and a gradation value RG of green that is added to the output signal by the signal processing to stabilize the chromaticity of red. The gradation value RR of red is, for example, a value obtained by gamma conversion of the gradation value of red indicated by the input signal. FIG. 9 illustrates a 16-bit linear gradation value as an example of the gradation value RR of red. The gradation value RG of green is a gradation value of green that is determined based on the gradation value of red (R) indicated by the input signal as described with reference to FIG. 7 and is added to the output signal by the signal processing to stabilize the chromaticity of red. FIG. 9 illustrates a 16-bit linear gradation value as an example of the gradation value RG of green.

The drive IC 210 also derives a gradation value GG of green from the gradation value Gin based on the data corresponding to the gamma curve described above. The gradation value GG of green is, for example, a value obtained by gamma conversion of the gradation value of green indicated by the input signal. FIG. 9 illustrates a 16-bit linear gradation value as an example of the gradation value GG of green. The drive IC 210 derives a gradation value (G) of green obtained by adding the gradation value RG of green to the gradation value GG of green. If the gradation value (G) of green exceeds the maximum value of the 16-bit linear gradation value, the gradation value (G) of green is adjusted to be the maximum value. This adjustment is made in the block "Limit" illustrated in FIG. 9. Prior to the processing of deriving the gradation value (G) of green by adding the gradation value RG of green to the gradation value GG of green, the drive IC 210 may derive an additional gradation value corresponding to the relation between the gradation value RG of green and the gradation value Gin based on the description with reference to FIG. 8, and the drive IC 210 may add the additional gradation value, instead of the gradation value RG of green, to the gradation value GG of green. It can be said that the gradation value RG of green is a gradation value that is added to add light at a light emission intensity corresponding to a first adjustment ratio to the light from the second sub-pixel 49G.

The drive IC 210 handles the gradation value RR of red as a gradation value (R) of red and performs inverse gamma conversion processing on the gradation value (R) of red to derive the output Rout. In FIG. 9, the gradation value of red indicated by the output signal that is output from the drive IC 210 after the signal processing is indicated as the output Rout. The data referred to in the inverse gamma conversion processing may be the data corresponding to the gamma curve described above, or may be dedicated data prepared for the inverse gamma conversion. In FIG. 9, information amount changing processing is also performed to derive an 8-bit output Rout from the 16-bit gradation value (R) of red, along with the inverse gamma conversion.

The drive IC 210 performs the inverse gamma conversion processing on the gradation value (G) of green obtained by adding the gradation value RG of green to the gradation value GG of green. In FIG. 9, the information amount changing processing is also performed to derive a 10-bit gradation value (G) of green from the 16-bit gradation value (G) of green, along with the inverse gamma conversion.

The drive IC 210 applies frame rate control (FRC) to reproduce the 10-bit green with the second sub-pixel 49G, the light emission intensity of which is controlled corresponding to an 8-bit gradation value of green. In the reproduction of green by the second sub-pixel 49G, a degree of change in the light emission intensity due to an increase in gradation value by one may be too excessive as an appropriate degree of change for adjusting the chromaticity of red. That is, even if the additional gradation value described above is set lowest (1), the "change in green that is reproduced by the second sub-pixel 49G" caused by the additional gradation value may be too excessive as an appropriate degree of change for adjusting the chromaticity of red. Therefore, in order to reduce such an excessive change in green and to obtain an appropriate change for adjusting the chromaticity of red, the drive IC 210 of the embodiment performs the FRC to reflect the additional gradation value in some of a plurality of frame images.

To give an example, in an image having a plurality of frames continuously output at a predetermined frame rate by the display device 1, the additional gradation value is reflected in one frame per two frames, and as a result, the "change in green that is reproduced by the second sub-pixel 49G" caused by the additional gradation value can be reduced to 50% of that in the case of not applying the FRC. Reflecting the additional gradation value in three frames per four frames can reduce the "change in green that is reproduced by the second sub-pixel 49G" caused by the additional gradation value to 75% of that in the case of not applying the FRC. Based on the same idea, reflecting the additional gradation value in q frames per p frames can reduce the "change in green that is reproduced by the second sub-pixel 49G" caused by the additional gradation value to q/p of that in the case of not applying the FRC. In this manner, the display device 1 can reproduce the 10-bit green with the second sub-pixel 49G, the light emission intensity of which is controlled corresponding to the 8-bit gradation value of green. FIG. 9 indicates the green that is reproduced using FRC as the output Gout.

In the embodiment, the increase in gradability by FRC is applied only to the reproduction of green, and not applied to red or blue. The reason why the FRC is particularly necessary for the reproduction of green is that, in the case of a display device conforming to BT.709, the ratio of the luminance component of red to the luminance component of green is 0.3576:0.7152 when all the sub-pixels 49 are lit up at the maximum luminance. That is, the luminance of green is twice as high as the luminance of red. In order to fine-adjust green, which is thus seen by humans as a higher-luminance color than other colors, for adjusting the chromaticity of red, the output control accuracy needs to be ensured with a larger number of gradations. To ensure the output control accuracy, the FRC is employed. Note that, in the International Telecommunication Union Radiocommunication Sector (ITU), BT.709 is a reference, defined by the Radiocommunication Sector (ITU-R), for standardizing image encoding and signal characteristics in display devices.

The drive IC 210 handles the gradation value Bin as the output Bout as it is. In FIG. 9, the gradation value of blue indicated by the output signal output from the drive IC 210 after the signal processing, is indicated as the output Bout.

The flow of the signal processing is not limited to that illustrated in FIG. 9. The following describes another example of the flow of the signal processing with reference to FIG. 10.

Figure 10:
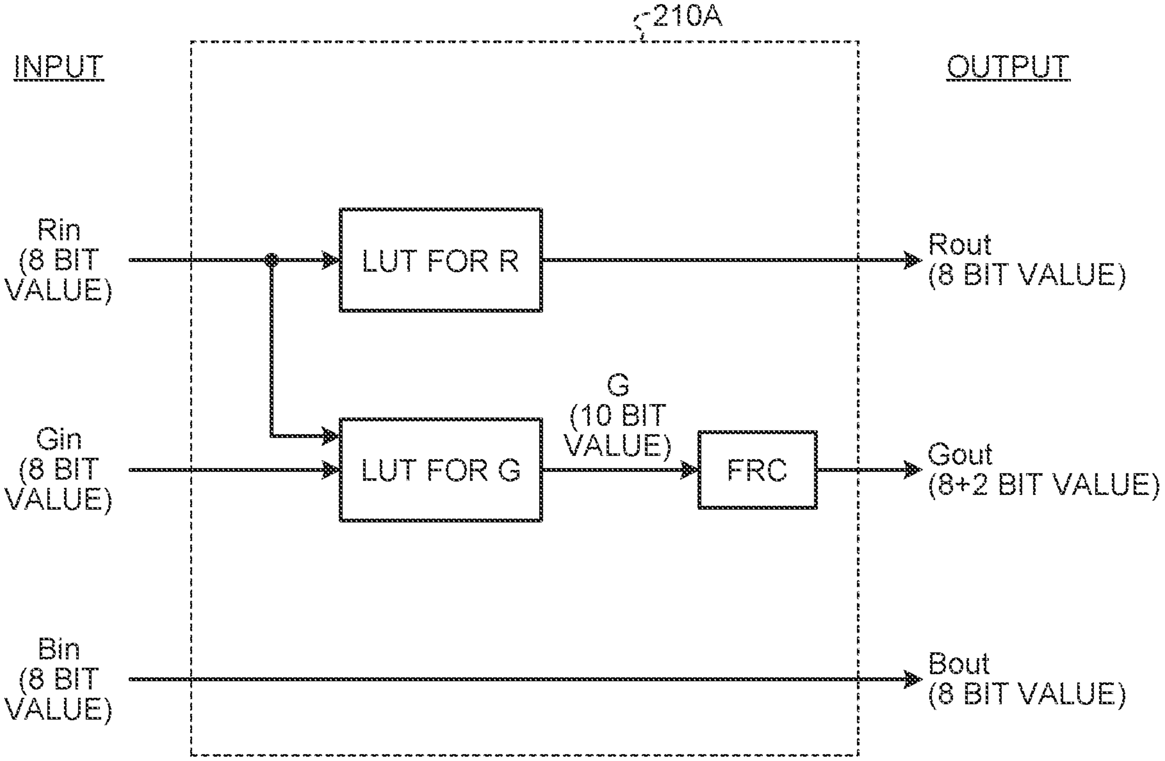
FIG. 10 is a diagram illustrating an exemplary flow of signal processing performed by a drive IC that performs signal processing different from the signal processing illustrated in FIG. 9.

FIG. 10 is a diagram illustrating an exemplary flow of signal processing performed by a drive IC 210A that performs signal processing different from the signal processing illustrated in FIG. 9. When the example illustrated in FIG. 10 is applied, the drive IC 210A is employed instead of the drive IC 210. The drive IC 210A has the same configuration as that of the drive IC 210 except that the details of the flow of the signal processing differ from those of the drive IC 210.

The drive IC 210A derives the output Rout corresponding to the gradation value Rin with reference to a dedicated LUT (LUT for R). The LUT for R indicates a relation between the input (gradation value Rin) and the output (output Rout) that allows derivation of the same result as that of the calculation for deriving the output Rout from the gradation value Rin, the calculation including the derivation of the gradation value RR of red in the process described with reference to FIG. 9. The LUT for R is held by the drive IC 210A.

The drive IC 210A derives the output Gout corresponding to the gradation values Rin and Gin with reference to a dedicated LUT (LUT for G). The LUT for G indicates a relation between the input (gradation value Gin) and the output (output Gout) that allows derivation of the same result as that of the calculation for deriving the output Gout from the gradation value Gin, the calculation including the derivation of the gradation value RG of green and the gradation value GG of green in the process described with reference to FIG. 9. The LUT for G is held by the drive IC 210A. The mechanism of how the FRC is performed based on the "gradation value (G) of green obtained by adding the gradation value RG of green to the gradation value GG of green" in the description with reference to FIG. 9 is also applied to the drive IC 210A in the same manner.

In the same manner as with the drive IC 210, the drive IC 210A handles the gradation value Bin as the output Bout as it is.

While the signal processing to stabilize the chromaticity of red that is reproduced by lighting of the pixel Pix has been described above, the signal processing may further include processing to stabilize the chromaticity of green.

Figure 11:
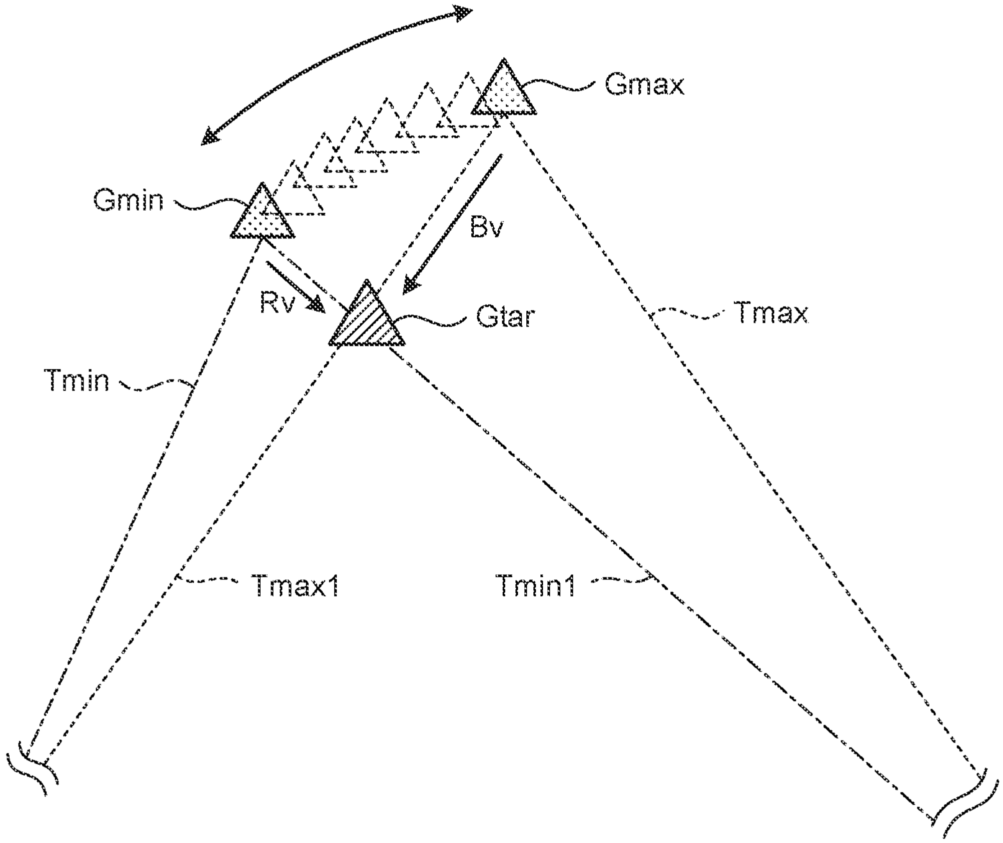
FIG. 11 is a schematic diagram illustrating how the chromaticity of green is stabilized.

FIG. 11 is a schematic diagram illustrating how the chromaticity of green is stabilized. As described with reference to FIG. 4, the chromaticity range that can be reproduced when the first sub-pixel 49R, the second sub-pixel 49G, and the third sub-pixel 49B are all in the low-luminance state, can be expressed as the first chromaticity range Tmin illustrated in FIG. 4. The chromaticity range that can be reproduced when the first sub-pixel 49R, the second sub-pixel 49G, and the third sub-pixel 49B are all in the high-luminance state, can be expressed as the second chromaticity range Tmax illustrated in FIG. 4.

The third green Gtar denotes chromaticity located in a position of intersection between one side Tmin1 of the first chromaticity range Tmin connecting the first green Gmin to the first red Rmin (refer to FIG. 4) and one side Tmax1 of the second chromaticity range Tmax connecting the second green Gmax to the blue Bcom (refer to FIG. 4). The position of the third green Gtar is a position obtained by moving the first green Gmin toward the first red Rmin by a chromaticity shift amount Rv. Therefore, the third green Gtar can be reproduced by adding a component of red (R) corresponding to the chromaticity shift amount Rv to the first green Gmin. The position of the third green Gtar is a position obtained by moving the second green Gmax toward the blue Bcom by a chromaticity shift amount Bv. Therefore, the third green Gtar can be reproduced by adding a component of blue corresponding to the chromaticity shift amount Bv to the second green Gmax.

The chromaticity of the color reproduced by the second sub-pixel 49G is included in a chromaticity shift range between the first green Gmin in the low-luminance state and the second green Gmax in the high-luminance state, depending on the luminance. In FIG. 11, colors included in the chromaticity shift range other than the first green Gmin and the second green Gmax, are schematically illustrated as dashed triangles. The third green Gtar can be generated by adding a component of red (R) and/or a component of blue to colors included in the chromaticity shift range as appropriate.

Figure 12:
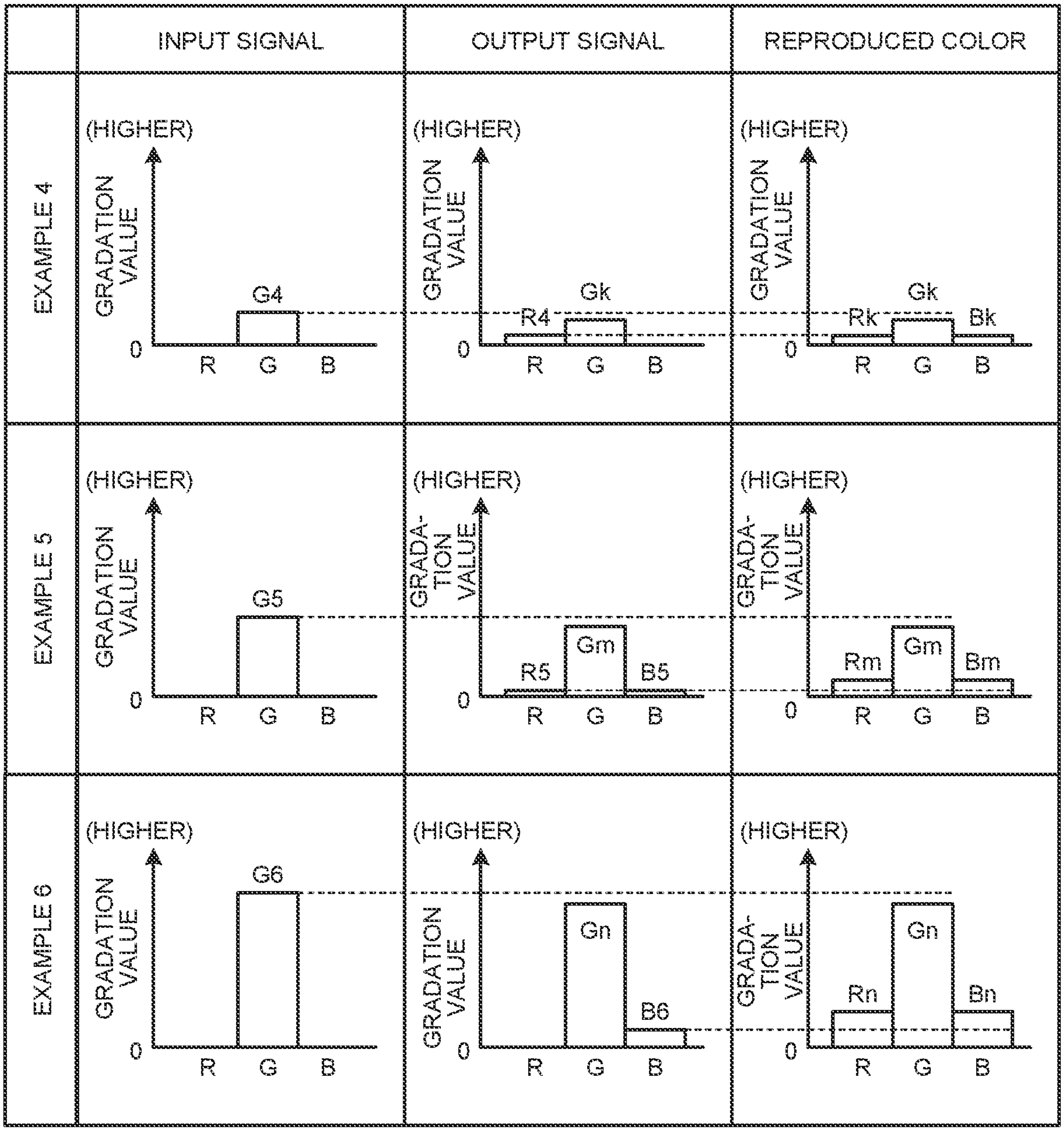
FIG. 12 is a chart illustrating Example 4, Example 5, and Example 6 obtained by the signal processing performed in the embodiment.

FIG. 12 is a chart illustrating Example 4, Example 5, and Example 6 obtained by the signal processing performed in the embodiment.

The input signal in Example 4 illustrated in FIG. 12 represents the input signal when the second sub-pixel 49G is lit up in the low-luminance state where the first green Gmin is reproduced when the signal processing is not performed. In FIG. 12, a gradation value G4 denotes the gradation value of green indicated by the input signal.

The input signal in Example 5 represents the input signal when the second sub-pixel 49G is lit up in an intermediate luminance state between the low-luminance state where the first green Gmin is reproduced and the high-luminance state where the second green Gmax is reproduced when the signal processing is not performed. In FIG. 12, a gradation value G5 denotes the gradation value of green indicated by the input signal.

The input signal in Example 6 represents the input signal when the second sub-pixel 49G is lit up in the high-luminance state where the second green Gmax is reproduced when the signal processing is not performed. In FIG. 12, a gradation value G6 denotes the gradation value of green indicated by the input signal.

As illustrated in FIG. 12, the gradation value G4 is a gradation value lower than the gradation values G5 and G6. The gradation value G5 is a gradation value higher than the gradation value G4 and lower than the gradation value G6. The gradation value G6 is a gradation value higher than the gradation values G4 and G5.

The drive IC 210 performs the signal processing individually for each of the pixels Pix to add a red component when the gradation value of green indicated by the input signal is the gradation value G4, add a blue component when the gradation value of green indicated by the input signal is the gradation value G6, and add red and blue components when the gradation value of green indicated by the input signal is a gradation value between the gradation values G4 and G6 (for example, the gradation value G5). In addition, the drive IC 210 causes a decrease in luminance in the second sub-pixel 49G corresponding to the increase in luminance of the pixel Pix caused by lighting of the first sub-pixel 49R and the third sub-pixel 49B resulting from the addition of at least one of the red component and the blue component. Specifically, to reduce the luminance, the drive IC 210 performs the signal processing individually for each of the pixels Pix to lower the gradation value of green in the output signal to a value lower than the gradation value of green in the input signal. As a result, the output signal in Example 4 further includes a gradation value R4 in addition to a gradation value Gk lower than the gradation value G4 included in the input signal in Example 4. The output signal in Example 5 further includes a gradation value R5 and a gradation value B5 in addition to a gradation value Gm lower than the gradation value G5 included in the input signal in Example 5. The output signal in Example 6 further includes a gradation value B6 in addition to a gradation value Gn lower than the gradation value G6 included in the input signal in Example 6.

According to the output signals described above, the reproduced color of the pixel Pix in Example 4 is a color that can be represented by a combination of a gradation value Rk serving as a gradation value of red, the gradation value Gk serving as a gradation value of green, and a gradation value Bk serving as a gradation value of blue. The blue component corresponding to the gradation value Bk is produced by the second sub-pixel 49G in the low-luminance state due to the light emission characteristics of the second sub-pixel 49G. The reproduced color of the pixel Pix in Example 5 is a color that can be represented by a combination of a gradation value Rm serving as a gradation value of red, the gradation value Gm serving as a gradation value of green, and a gradation value Bm serving as a gradation value of blue. The reproduced color of the pixel Pix in Example 6 is a color that can be represented by a combination of a gradation value Rn serving as a gradation value of red, the gradation value Gn serving as a gradation value of green, and a gradation value Bn serving as a gradation value of blue. The red component corresponding to the gradation value Rn is produced by the second sub-pixel 49G in the high-luminance state due to the light emission characteristics of the second sub-pixel 49G.

The ratio between the gradation value Rk, the gradation value Gk, and the gradation value Bk, the ratio between the gradation value Rm, the gradation value Gm, and the gradation value Bm, and the ratio between the gradation value Rn, the gradation value Gn, and the gradation value Bn can be expressed as a substantially common ratio $\gamma:\Delta:\varepsilon$. That is, the reproduced color of the pixel Pix in Example 4, the reproduced color of the pixel Pix in Example 5, and the reproduced color of the pixel Pix in Example 6 are a common color in the chromaticity diagram. Specifically, the common color is the third green Gtar in FIG. 11. Thus, in the embodiment, the signal processing stabilizes the chromaticity of green reproduced by the lighting of the pixel Pix regardless of the level of the gradation value of green indicated by the input signal.

Although not illustrated in the drawings, in order also to stabilize the chromaticity of green, preparation is made in advance of data for the same purpose as that of the data for deriving the additional gradation value in correspondence with the relation between the gradation value of red and the gradation value of green indicated by the input signal, as described with reference to FIG. 7 and FIG. 8.

Figure 13:
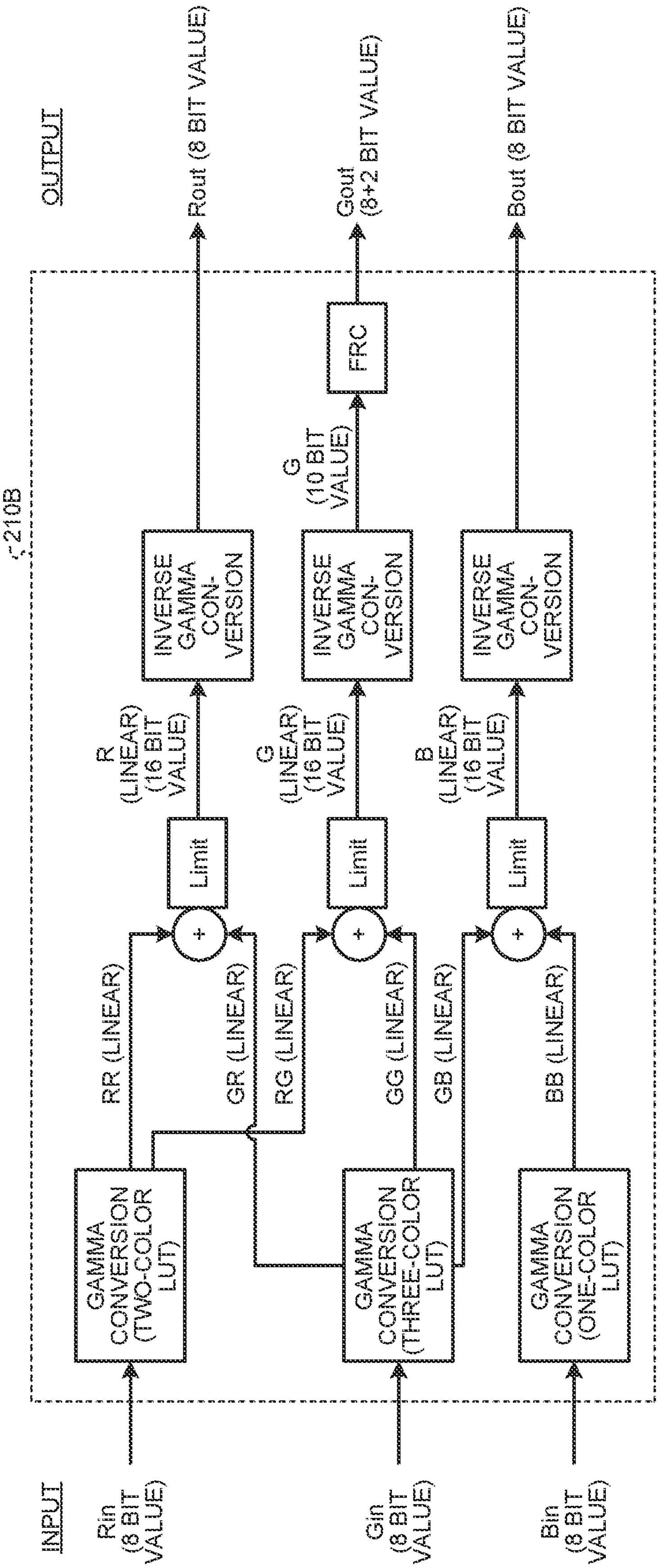
FIG. 13 is a diagram illustrating an exemplary flow of the signal processing performed by the drive IC.

With reference to FIG. 13, the following describes a flow of signal processing by a drive IC 210B that performs the signal processing to stabilize the chromaticity of red and green. The drive IC 210B has the same configuration as that of the drive IC 210 except that the details of the flow of the signal processing differ from those of the drive IC 210.

FIG. 13 is a diagram illustrating an exemplary flow of the signal processing performed by the drive IC 210B.

The drive IC 210B performs the gamma conversion processing based on the gradation value Rin. Specifically, in the same manner as with the drive IC 210, the drive IC 210B derives the gradation value RR of red and the gradation value RG of green from the gradation value Rin based on the LUT (two-color LUT) corresponding to the data described above with reference to FIG. 7 and the data corresponding to the gamma curve.

The drive IC 210B also performs the gamma conversion processing based on the gradation value Gin. Specifically, the drive IC 210B derives a gradation value GR of red, the gradation value GG of green, and a gradation value GB of blue from the gradation value Gin with reference to the above-described data for stabilizing the chromaticity of green. The gradation value GR of red and the gradation value GB of blue are gradation values to be added to the output signal in the signal processing to stabilize the chromaticity of green.

The drive IC 210B also derives a gradation value BB of blue from the gradation value Bin based on the data corresponding to the gamma curve described above. The gradation value GR of red, the gradation value GB of blue, and the gradation value BB of blue are, for example, 16-bit gradation values.

The drive IC 210B derives the gradation value (R) of red obtained by adding the gradation value RR of red to the gradation value GR of red. If the gradation value (R) of red exceeds the maximum value of the 16-bit linear gradation value, the gradation value (R) of red is adjusted to be the maximum value. This adjustment is made in a block “Limit” at the location of an adder (+) between RR (linear) and GR (linear) illustrated in FIG. 13. The drive IC 210B performs the inverse gamma conversion processing on the gradation value (R) of red to derive the output Rout. In FIG. 13, the information amount changing processing is also performed to derive the 8-bit output Rout from the 16-bit gradation value (R) of red, along with the inverse gamma conversion. It can be said that the gradation value GR of red is a gradation value that is added to add light at a light emission intensity corresponding to a second adjustment ratio to the light from the first sub-pixel 49R.

In the same manner as with the drive IC 210, the drive IC 210B derives the gradation value (G) of green obtained by adding the gradation value RG of green to the gradation value GG of green. If the gradation value (G) of green exceeds the maximum value of the 16-bit linear gradation value, the gradation value (G) of green is adjusted to be the maximum value. This adjustment is made in a block “Limit” at the location of an adder (+) between RG (linear) and GG (linear) illustrated in FIG. 13. The drive IC 210B performs the inverse gamma conversion processing on the gradation value (G) of green to derive the output Gout. In FIG. 13, the information amount changing processing is also performed to derive the 10-bit output Gout from the 16-bit gradation value (G) of green, along with the inverse gamma conversion. In the same manner as the drive IC 210, the drive IC 210B applies the FRC to reproduce the 10-bit green in the second sub-pixel 49G, the light emission intensity of which is controlled corresponding to the 8-bit gradation value of green.

The drive IC 210B also derives the gradation value (B) of blue obtained by adding the gradation value GB of blue and the gradation value BB of blue. If the gradation value (B) of blue exceeds the maximum value of the 16-bit linear gradation value, the gradation value (B) of blue is adjusted to be the maximum value. This adjustment is made in a block “Limit” at the location of an adder (+) between GB (linear) and BB (linear) illustrated in FIG. 13. The drive IC 210B performs the inverse gamma conversion processing on the gradation value (B) of blue to derive the output Bout. In FIG. 13, the information amount changing processing is also performed to derive the 8-bit output Bout from the 16-bit gradation value (B) of blue, along with the inverse gamma conversion. It can be said that the gradation value GB of blue is a gradation value that is added to add light at a light emission intensity corresponding to a third adjustment ratio to the light from the third sub-pixel 49B.

The flow of the signal processing for stabilizing the chromaticity of red and green is not limited to that illustrated in FIG. 13. The following describes another example of the flow of the signal processing with reference to FIG. 14.

Figure 14:
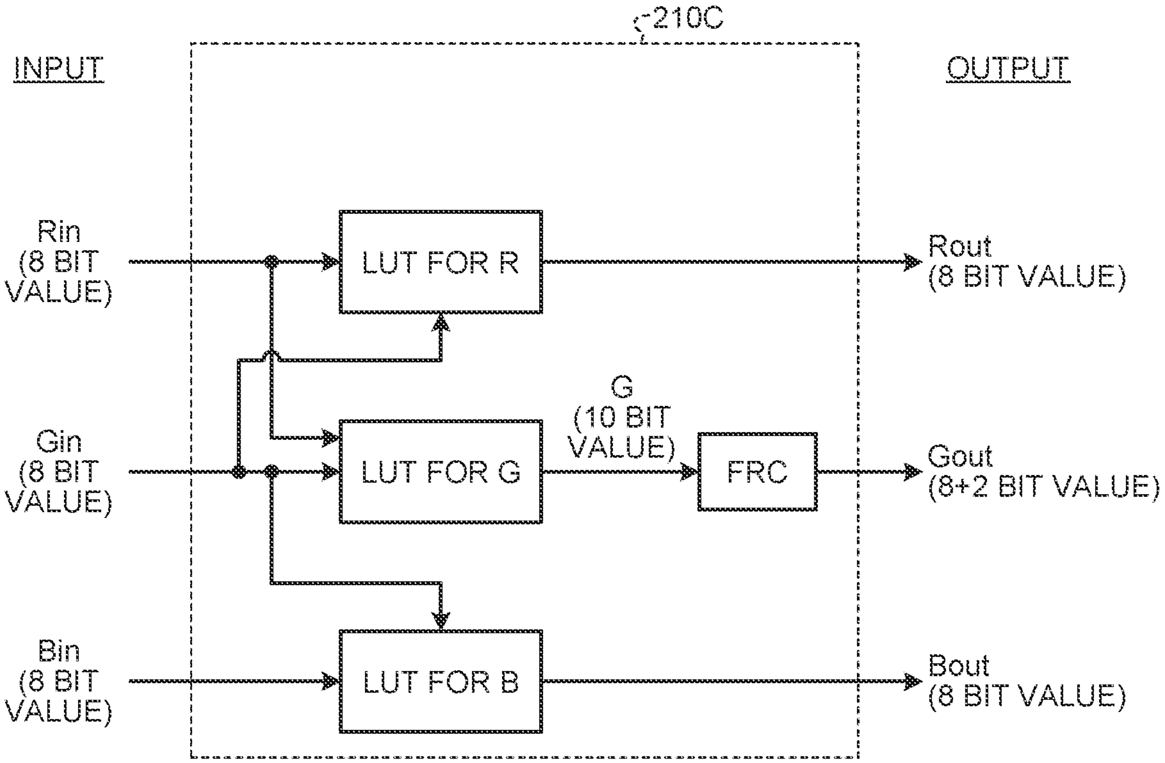
FIG. 14 is a diagram illustrating an exemplary flow of signal processing performed by a drive IC that performs signal processing different from the signal processing illustrated in FIG. 13.

FIG. 14 is a diagram illustrating an exemplary flow of signal processing performed by a drive IC 210C that performs signal processing different from the signal processing illustrated in FIG. 13. When the example illustrated in FIG. 14 is applied, the drive IC 210C is employed instead of the drive IC 210B. The drive IC 210C has the same configuration as that of the drive IC 210 except that the details of the flow of the signal processing differ from those of the drive IC 210.

The drive IC 210C derives the output Rout corresponding to the gradation values Rin and Gin with reference to the dedicated LUT (LUT for R). The LUT for R indicates a relation between the inputs (gradation values Rin and Gin) and the output (output Rout) that allows derivation of the same result as that of the calculation for deriving the output Rout from the gradation values Rin and Gin, the calculation including the derivation of the gradation value RR of red and the gradation value GR of red in the process described with reference to FIG. 13. The LUT for R is held by the drive IC 210C.

The drive IC 210C also derives the output Gout corresponding to the gradation values Rin and Gin with reference to the dedicated LUT (LUT for G). The LUT for G indicates a relation between the input (gradation value Gin) and the output (output Gout) that allows derivation of the same result as that of the calculation for deriving the output Gout from the gradation value Gin, the calculation including the derivation of the gradation values RG and GG of green in the process described with reference to FIG. 9. The LUT for G is held by the drive IC 210C. The mechanism of how the FRC is performed is also applied to the drive IC 210C in the same manner.

The drive IC 210C also derives the output Bout corresponding to the gradation values Gin and Bin with reference to a dedicated LUT (LUT for B). The LUT for B indicates a relation between the inputs (gradation values Gin and Bin) and the output (output Bout) that allows derivation of the same result as that of the calculation for deriving the output Bout from the gradation values Gin and Bin, the calculation including the derivation of the gradation values GB and BB of blue in the process described with reference to FIG. 13. The LUT for B is held by the drive IC 210C.

As described above, according to the embodiment, the display device 1 includes the pixel Pix including the first sub-pixel 49R that emits the light having the peak in the red spectrum, the second sub-pixel 49G that emits the light having the peak in the green spectrum, and the third sub-pixel 49B that emits the light having the peak in the blue spectrum. The first sub-pixel 49R, the second sub-pixel 49G, and the third sub-pixel 49B are inorganic light-emitting diodes. When the first sub-pixel 49R emits light at a light emission intensity within the low-luminance range equal to or lower than the predetermined level of luminance, the light emission intensity of the second sub-pixel 49G is increased at the predetermined ratio with respect to the light emission intensity of the first sub-pixel 49R. This operation can adjust the spectrum of the light emitted from the first sub-pixel 49R lit up at the light emission intensity within the low-luminance range so as to match the spectrum of light of the first sub-pixel 49R produced in a high-luminance range outside the low-luminance range. Therefore, the chromaticity of red that is seen for each of the pixels Pix can be stabilized regardless of the light emission intensity of the first sub-pixel 49R. That is, the chromaticity can be restrained from being changed by the change in level of the light emission intensity.

When the first sub-pixel 49R emits light at a relatively low luminance level within the low-luminance range described above, the first adjustment ratio is larger than that when the first sub-pixel 49R emits light at a relatively high luminance level. The first adjustment ratio is a ratio of the light emission intensity of the second sub-pixel 49G for adjusting the red that is reproduced by the pixel Pix to the light emission intensity of the first sub-pixel 49R. This ratio can adjust the light emission intensity of the second sub-pixel 49G so as to supplement the green component in the case of the low-luminance state, according to the light emission characteristics of the first sub-pixel 49R in which a green component in the high-luminance state is stronger than in the low-luminance state. Therefore, the chromaticity of red that is seen for each of the pixels Pix can be stabilized regardless of the light emission intensity of the first sub-pixel 49R. That is, the chromaticity can be restrained from being changed by the change in level of the light emission intensity.

The second sub-pixel 49G emits light at a light emission intensity corresponding to a value obtained by adding together the gradation value of green indicated by the input signal for the display device 1 and the additional gradation value based on the gradation value of red indicated by the input signal and the above-described first adjustment ratio. This configuration allows both the reproduction of green corresponding to the gradation value of green indicated by the input signal and the reduction in change in the chromaticity of red.

When the second sub-pixel 49G emits light at a relatively low luminance level, the second adjustment ratio is larger than that when the second sub-pixel 49G emits light at a relatively high luminance level. When the second sub-pixel 49G emits light at a relatively high luminance level, the third adjustment ratio is larger than that when the second sub-pixel 49G emits light at a relatively low luminance level. The second adjustment ratio is a ratio of the light emission intensity of the first sub-pixel 49R for adjusting the green that is reproduced by the pixel Pix to the light emission intensity of the second sub-pixel 49G. The third adjustment ratio is a ratio of the light emission intensity of the third sub-pixel 49B for adjusting the green that is reproduced by the pixel Pix to the light emission intensity of the second sub-pixel 49G. This ratio can adjust the light emission intensity of the first sub-pixel 49R so as to supplement the red component in the case of the low-luminance state and can adjust the light emission intensity of the second sub-pixel 49G so as to supplement the blue component in the case of the high-luminance state, according to the light emission characteristics of the second sub-pixel 49G in which a red component in the high-luminance state is stronger than in the low-luminance state and a blue component in the low-luminance state is stronger than in the high-luminance state. Therefore, the chromaticity of green that is seen for each of the pixels Pix can be stabilized regardless of the light emission intensity of the second sub-pixel 49G. That is, the chromaticity can be restrained from being changed by the change in level of the light emission intensity.

The first sub-pixel 49R emits light at a light emission intensity corresponding to a value obtained by adding together the gradation value of red indicated by the input signal for the display device 1 and the additional gradation value based on the gradation value of green indicated by the input signal and based on the second adjustment ratio. The third sub-pixel 49B emits light at a light emission intensity corresponding to a value obtained by adding together the gradation value of blue indicated by the input signal for the display device 1 and the additional gradation value based on the gradation value of green indicated by the input signal and based on the third adjustment ratio. This configuration allows all of the reproduction of red corresponding to the gradation value of red indicated by the input signal, the reproduction of blue corresponding to the gradation value of blue indicated by the input signal, and the reduction in change in the chromaticity of green.

The output gradability of green is greater than the output gradability of red and the output gradability of blue. Therefore, the output gradability of green required to adjust the chromaticity of red can be reliably ensured.

The output gradability of green is obtained by combining the output gradability of the second sub-pixel 49G with the FRC. This combination enables more reliable securement of the output gradability of green required to adjust the chromaticity of red, even when the output gradability of green required to adjust the chromaticity of red is difficult to be ensured by only adjusting the light emission intensity of the second sub-pixel 49G.

The FRC is not applied to increase of the output gradability of red nor increase of the output gradability of blue. As a result, the output of red and blue can be further stabilized over the entire frame period.

The numbers of bits for indicating the various signals and the number of gradations employed in the description above are merely examples, are not limited thereto, and can be changed as appropriate.

Other operational advantages accruing from the aspects described in the embodiment herein that are obvious from the description herein or that are appropriately conceivable by those skilled in the art will naturally be understood as accruing from the present disclosure.

What is claimed is:

1. A display device comprising:

a pixel including a first sub-pixel configured to emit light having a peak in a spectrum of red, a second sub-pixel configured to emit light having a peak in a spectrum of green, and a third sub-pixel configured to emit light having a peak in a spectrum of blue, wherein the first sub-pixel, the second sub-pixel, and the third sub-pixel are inorganic light-emitting diodes, and a light emission intensity of the third sub-pixel is decreased at a predetermined ratio with respect to a light emission intensity of the second sub-pixel when the second sub-pixel emits light at a light emission intensity within a low-luminance range equal to or lower than a predetermined level of luminance, an input signal for the display device indicates a gradation value of the red, a gradation value of the green, and a gradation value of the blue, and when the gradation values of other than green of the input signal are zero, a ratio of the gradation value of the blue to the gradation value of the green in an output signal is lower, as the gradation value of the green in the input signal is lower within the low-luminance range.

2. The display device according to claim 1, wherein when the second sub-pixel emits light at a relatively low luminance level within the low-luminance range, a first adjustment ratio is larger than that when the second sub-pixel emits light at a relatively high luminance level, and the first adjustment ratio is a ratio of the light emission intensity of the third sub-pixel for adjusting the blue that is reproduced by the pixel to the light emission intensity of the second sub-pixel.

3. The display device according to claim 1, wherein an output gradability of the green is greater than an output gradability of the red and an output gradability of the blue.

4. The display device according to claim 3, wherein the output gradability of the green is obtained by combining an output gradability of the second sub-pixel with frame rate control.

5. The display device according to claim 4, wherein the frame rate control is not applied to increase of the output gradability of the red nor increase of the output gradability of the blue.

6. The display device according to claim 1, wherein when the second sub-pixel emits light at a relatively high luminance level, a third adjustment ratio is larger than that when the second sub-pixel emits light at a relatively low luminance level, and the third adjustment ratio is a ratio of the light emission intensity of the third sub-pixel for adjusting the green that is reproduced by the pixel to the light emission intensity of the second sub-pixel.

7. The display device according to claim 1, wherein when the second sub-pixel emits light at a relatively low luminance level, a second adjustment ratio is larger than that when the second sub-pixel emits light at a relatively high luminance level, and the second adjustment ratio is a ratio of the light emission intensity of the first sub-pixel for adjusting the green that is reproduced by the pixel to the light emission intensity of the second sub-pixel.

8. The display device according to claim 1, wherein when the gradation values of other than green of the input signal are zero, the gradation value of the green in the output signal is lower than the gradation value of the green in the input signal.

* * * * *